US012765721B2

(12) United States Patent
Carbone et al.

(10) Patent No.: US 12,765,721 B2
(45) Date of Patent: Oct. 20, 2026

(54) HEATING ASSEMBLY FOR COOKING APPLIANCE

(71) Applicant: Revolution Cooking, LLC, Potomac, MD (US)

(72) Inventors: Philip C. Carbone, North Reading, MA (US); Peter J. Loftus, Cambridge, MA (US); Ryan O'Donnell, Ipswich, MA (US); Cody O'Sullivan, London (GB); James Poon, Woburn, MA (US); Aurelio Reyes, Mount Dora, FL (US); Richard Simmers, Boxford, MA (US)

(73) Assignee: Revolution Cooking, LLC, Potomac, MD (US)

( * ) Notice: Subject to any disclaimer, the term of this patent is extended or adjusted under 35 U.S.C. 154(b) by 1023 days.

(21) Appl. No.: 17/976,013

(22) Filed: Oct. 28, 2022

(65) Prior Publication Data

US 2023/0055637 A1 Feb. 23, 2023

Related U.S. Application Data

(63) Continuation of application No. 17/356,719, filed on Jun. 24, 2021, now Pat. No. 11,517,148, which is a (Continued)

(51) Int. Cl.
*A47J 37/08* (2006.01)

(52) U.S. Cl.
CPC ....... *A47J 37/0807* (2013.01); *A47J 37/0871* (2013.01)

(58) Field of Classification Search
CPC ... H05B 3/03; H05B 3/06; H05B 3/12; H05B 3/16; H05B 3/24; H05B 3/26; H05B 3/32;
(Continued)

(56) References Cited

U.S. PATENT DOCUMENTS

| | | | |
|---|---|---|---|
| 1,900,249 | A | 3/1933 | Miller et al. |
| 2,329,937 | A | 9/1943 | Orkfritz |

(Continued)

FOREIGN PATENT DOCUMENTS

| | | | |
|---|---|---|---|
| CN | 1827022 | A | 9/2006 |
| CN | 201088488 | Y | 7/2008 |
| WO | WO 2018/129416 | A1 | 7/2018 |

OTHER PUBLICATIONS

Invitation to Pay Additional Fees for International Application No. PCT/US2020/018052, mailed Jun. 8, 2020.

(Continued)

*Primary Examiner* — Hung D Nguyen
(74) *Attorney, Agent, or Firm* — Wolf, Greenfield & Sacks, P.C.

(57) ABSTRACT

A cooking appliance, such as a toaster or oven, has a lifting arm including ribs that form a support surface for a food product in a cooking cavity of the appliance. Each rib can include an opening configured to permit infrared radiation from a heating assembly to pass through the rib to the food product supported by the lifting arm and/or to reduce a thermal mass and capacitance of the lifting arm. The heating assembly can include a support and/or heating element with a curved shape having a concave side facing a cooking cavity. The support and/or heating element can have a planar shape when unstressed and a curved shape when stressed. The heating element may be coupled to the support so as to be slidably movable relative to the support, e.g., so the heating element can slide relative to the support.

27 Claims, 19 Drawing Sheets

Related U.S. Application Data continuation of application No. 16/789,763, filed on Feb. 13, 2020, now Pat. No. 11,517,147.

(60) Provisional application No. 62/806,691, filed on Feb. 15, 2019.

(58) Field of Classification Search

CPC . H05B 3/34; H05B 3/342; H05B 3/36; H05B 2203/002; H05B 2203/004; H05B 2203/003; H05B 2203/007; H05B 2203/011; H05B 2203/017; H05B 2203/026; H05B 2203/032; H05B 2203/035; H05B 6/6482; H05B 6/68; A47J 37/04043; A47J 37/0611; A47J 37/0623; A47J 37/0629; A47J 37/0635; A47J 37/0676; A47J 37/0688; A47J 37/08; A47J 37/0807; A47J 37/0814; A47J 37/0871; F24C 7/04; F24C 7/043; F24C 7/046; F24C 7/067

See application file for complete search history.

(56) References Cited

U.S. PATENT DOCUMENTS

| | | | | |
|---|---|---|---|---|
| 2,541,207 | A | 2/1951 | Cole | |
| 2,669,925 | A | 2/1954 | Rouse et al. | |
| 3,146,337 | A | 8/1964 | Jeru | |
| 3,169,469 | A | 2/1965 | Parr | |
| 3,747,507 | A | 7/1973 | McIntosh | |
| 3,798,417 | A | 3/1974 | Bittner et al. | |
| 3,860,789 | A * | 1/1975 | Maake | F24H 1/103 219/400 |
| 4,292,504 | A * | 9/1981 | Gebarowski | H05B 3/16 338/285 |
| 4,976,195 | A | 12/1990 | Cavazos | |
| 5,309,826 | A | 5/1994 | Oritz | |
| 6,205,910 | B1 | 3/2001 | Vaughn | |
| 6,429,407 | B1 | 8/2002 | Garber et al. | |
| 11,517,147 | B2 | 12/2022 | Carbone et al. | |
| 11,517,148 | B2 | 12/2022 | Carbone et al. | |
| 2005/0204927 | A1 | 9/2005 | Boyle et al. | |
| 2005/0205545 | A1 | 9/2005 | Siegel et al. | |
| 2006/0043240 | A1 * | 3/2006 | Hindel | B64D 15/12 244/133 |
| 2006/0180033 | A1 | 8/2006 | Pan et al. | |
| 2006/0201933 | A1 * | 9/2006 | Carpino, II | H05B 3/34 219/545 |
| 2007/0267403 | A1 | 11/2007 | Bonsal | |
| 2017/0238763 | A1 | 8/2017 | Mao | |
| 2019/0008322 | A1 | 1/2019 | Feldman et al. | |
| 2020/0260912 | A1 | 8/2020 | Carbone et al. | |
| 2021/0315420 | A1 | 10/2021 | Carbone et al. | |

OTHER PUBLICATIONS

International Search Report and Written Opinion for International Application No. PCT/US2020/018052, mailed Jul. 31, 2020.

International Preliminary Report on Patentability for International Application No. PCT/US2020/018052, mailed Aug. 26, 2021.

* cited by examiner

HEATING ASSEMBLY FOR COOKING APPLIANCE

RELATED APPLICATION

This Application is a continuation of U.S. patent application Ser. No. 17/356,719 filed Jun. 24, 2021, which is a continuation of U.S. patent application Ser. No. 16/789,763 filed Feb. 13, 2020, which claims priority under 35 U.S.C. § 119(e) to U.S. Provisional Application No. 62/806,691 filed Feb. 15, 2019, each of which is herein incorporated by reference in its entirety.

BACKGROUND

Various appliances are available for cooking or otherwise heating food. An oven, for example, is often used for cooking food at lower to moderate temperatures for fairly long periods of time. A microwave oven, on the other hand, utilizes microwave energy and can heat at least some foods more rapidly. Toasters and toaster ovens may suffer from certain drawbacks, such as slow cooking times and/or poor cooked food quality.

SUMMARY

In general terms, this disclosure is directed to a heating assembly for a cooking appliance, such as a toaster or oven. In some embodiments, and by non-limiting example, the heating assembly includes a heating element and/or support that has a curved shape and provides infrared radiation to a cooking cavity. The infrared radiation may provide faster cooking times and improved results.

In one embodiment, a cooking appliance includes a housing defining a cooking cavity for receiving food therein. A heating assembly may be arranged to provide infrared radiation into the cooking cavity and may include a support and an electrical resistance heating element coupled to the support. For example, the heating element may include a metal material that emits infrared and other electromagnetic radiation when electrical current is passed through the metal material. The heating element may be exposed to the cooking cavity, meaning that there is no other component between all or most portions of the heating element and the cooking cavity. For example, infrared radiation emitted by the heating element may travel directly from the heating element to the cooking cavity without passing through a guard, screen, filter, protective cover or other component. In the case of a heating element including a metal material, infrared radiation may be emitted from the metal material and travel directly to the cooking cavity without passing through any other portion of the cooking appliance.

In some embodiments, the heating element has a curved shape with a concave side facing towards the cooking cavity. For example, the heating element may define a sheet having a length and a width, and a plurality of openings are formed in the sheet. The sheet may have first and second opposed sides, and the heating element may be curved so that the first side of the sheet defines the concave side and faces the cooking cavity. As an example, the sheet may define a cylindrical shell-type or other curved shape with a concave side facing the cooking cavity. In some cases, the heating assembly includes a plurality of heating elements, and each of the plurality of heating elements may have an approximately equal curved shape, or may have different curved shapes. The heating element may be flexible, e.g., so a sheet defined by the heating element can be selectively bent into a curved shape. The heating element may be resilient, e.g., so that the element returns to a flat planar shape when a stress used to bend the element into a curved shape is released. Alternately, the heating element may be plastically deformed to take a curved shape, e.g., an initially planar heating element may be deformed into a curved shape that is maintained when the bending force is released. The heating element may be out of contact with the support at portions along the length of the sheet, e.g., at portions between longitudinal ends of the sheet. Thus, the heating element (or plurality of elements) may only contact the support in a few areas along a length of the heating element. This may help prevent heat loss of the heating element to the support, allowing the element to more effectively emit infrared radiation.

In some embodiments, a retainer may be positioned between the heating element(s) and the cooking cavity with the retainer extending over and contacting a part of the heating element(s). The retainer may help properly position the heating element(s) with respect to the support, e.g., holding the heating element(s) close to the support without contacting the support. The heating element(s) may be movable relative to the retainer, e.g., to allow the heating element(s) to thermally expand and contract and move relative to the support and retainer. In some cases, the retainer may cause the heating element(s) to take the curved shape. For example, the heating element(s) may be coupled to the support using a retainer (at least in part) with the heating element(s) and the support initially in a flat or planar configuration. The support may be bent to take a curved shape, and bending of the support may cause the heating element(s) to take a curved shape as well. For example, the retainer may hold the heating element(s) relative to the support so that the heating element(s) must move with the support as it is bent.

As noted above, in some embodiments the support has a curved shape with a concave side facing the cooking cavity, e.g., the curved shape may be similar to a curved shape of the heating element(s). In some cases, the support is configured to reflect infrared radiation emitted by the heating element in a direction toward the cooking cavity, and a curved shape may help the support direct radiation in a focused or otherwise directed way toward the cooking cavity. The support may be formed of a flexible sheet of material, and the heating element may be coupled to the support such that bending of the support forms the curved shape of the heating element. A coefficient of thermal expansion of the support may be less than a coefficient of thermal expansion of the heating element, e.g., the support and heating element may expand or contract at different rates for a same change in temperature. The heating element may be slidably coupled to the support, e.g., so the heating element can move relative to the support in directions along a surface of the support. For example, the heating element may have an elongated shape having a length, and the heating element may be fixed to the support at one end and free to move relative to the support along the length of the heating element due to thermal expansion and contraction.

The heating assembly may be mounted in the cooking appliance in various ways. For example, the appliance may have a chassis that defines the-cooking cavity and is disposed at least partially within the housing. The heating assembly may be supported in at least three different locations by the chassis, e.g., at a top wall, a bottom wall, and at least one side wall of the chassis. The top and bottom wall may apply a compressive force on the support that holds the support in a bent or curved shape, and the side wall may help the support maintain or assume a desired curvature. For example, the heating assembly may be supported at the at least one side wall by a clip that at least partially defines the curved shape of the heating element. The clip may not contact the heating element, e.g., may only contact the support, yet still help define the curved shape of the heating element by helping define the curved shape of the support. In some embodiments, an air gap is formed at least partially between the housing and the chassis, e.g., so that heat generated by the heating assembly in the chassis can be vented or prevented from being conducted to the housing.

In one embodiment, a heating assembly for a cooking appliance includes a support and an electrical resistance heating element defining a sheet having a length and a width and a plurality of openings formed in the sheet. The support may provide physical support to the heating element, or perform other functions such as reflecting infrared radiation emitted by the heating element in a direction toward the heating element. The heating element, or a plurality of such elements, may be slidably coupled to the support such that the heating element is movable relative to the support along the length of the heating element. Such coupling of the heating element(s) to the support may allow movement relative to the support, e.g., if the heating element thermally expands or contracts, or if the support is bent or otherwise manipulated. For example, the support may be bent to take a curved shape with a concave side at the side where the heating element is mounted to the support. Such bending of the support may put stress on the heating element if the heating element is unable to move relative to the support. However, by coupling the heating element so as to be slidably movable relative to the support, the support may be bent from a flat, planar shape to a curved shape without placing stress on the heating element in directions parallel to the plane of the heating element sheet. Thus, bending of the support may cause the heating element to bend as well to take a curved shape similar to that of the support, but the heating element may slide or otherwise move relative to the support in one or more directions along the surface of the support and/or parallel to the heating element sheet so that heating element is not stressed or deformed along its length or width. Thus, in some cases, the support may include a flexible sheet of material, and the heating element(s) and support may be configured to bend such that the support and the heating element(s) each have a curved shape.

In some embodiments, a retainer may be coupled over the heating element(s) and to the support such that the heating element is positioned between the support and the retainer. The heating element may be slidable along its length relative to the retainer, but the retainer may limit movement of the heating element in directions away from the support, e.g., perpendicular to the surface of the support and/or the sheet of the heating element. As a result, the retainer may cause the heating element(s) to be bent or curved with bending of the support, but allow the heating element(s) to slidably move relative to the support in directions along the surface of the support and/or of the heating element sheet. For example, the support may have a first side to which the heating element(s) and the retainer are coupled, and the support, heating element(s) and retainer may be configured such that bending of the support causes the support and the heating element(s) to have a curved shape with a concave side at the first side of the support. In some cases, the heating element(s) may have first and second opposed sides and the second side of the heating element(s) may be positioned nearer to the support than the first side. However, the heating element may contact the support in only one or more locations, e.g., the second side may be out of contact with the support at portions along the length of the heating element. This may help prevent heat loss from the heating element to the support by conduction. One or more retainers may extend over a part of the heating element(s), e.g., to restrain movement away from the support, but still allow the heating element(s) to largely avoid contact with the support. In some cases, a retainer may include a space that is positioned between the heating element and the support to maintain a separation distance between the heating element and the support. The retainer may be positioned over a part of the heating element(s) at a location between opposite ends of the heating elements, e.g., at a point midway along the length of the heating element(s).

In one embodiment, a method of assembling a cooking appliance includes providing a chassis that defines at least one cooking cavity for receiving food therein, where the chassis includes a top wall, a bottom wall, and at least one side wall. At least one heating assembly, e.g., including a support and a heating element attached to the support, may be inserted at least partially within the chassis. Prior to inserting the at least one heating assembly, the support is substantially flat, but is formed into a curved shaped and held within the chassis. A concave side of the heating assembly created by forming the heating assembly into a curved shape may face towards the at least one cooking cavity.

In one embodiment, a cooking appliance includes a housing defining a cooking cavity for receiving food therein, and a heating assembly arranged to provide infrared radiation into the cooking cavity. The heating assembly may include a support having a curved shape with a concave side facing toward the cooking cavity, and an electrical resistance heating element coupled to the support and exposed to the cooking cavity. The heating element may be curved, or not, e.g., have a flat, planar configuration. The support may be configured to have a planar shape when in an unstressed state and to have the curved shape when in a stressed state. For example, the support may include a sheet of flexible material that is flat and planar when unstressed and can be stressed, e.g., by bending, to take a curved shape. The support may be mounted in the cooking appliance in the stressed state such that the support maintains its curved shape with the concave side facing towards the cooking cavity even with thermal expansion and thermal contraction of the support. Thus, if the support elongates or contracts in one or more dimensions due to heating or cooling of the support, the support may remain in a stressed state and maintain a curved shape.

In one embodiment, one or more heating elements attached to the support may each define a sheet having a length and a width and having a plurality of openings formed in the sheet. As noted above, the support may include a flexible sheet of material, and the heating element and support may be configured to bend such that the support and the heating element each have the curved shape. For example, bending of the support may also cause bending of the attached heating element(s) to take a curved shape. A retainer may be coupled over the heating element and to the support such that the heating element is positioned between the support and the retainer. The heating element may be slidable along its length relative to the retainer and the support, and the heating element may be out of contact with the support at portions along its length. Each of the one or more heating elements may have first and second opposed sides with the second side positioned nearer to the support than the first side. The second side of the heating element(s)

may be out of contact with the support at portions along the length of the heating elements, e.g., to reduce heat loss by conduction to the support. The retainer may be positioned over the part of the heating element(s) at a location between opposite longitudinal ends of the heating element(s). In some cases, the retainer may include a spacer between the heating element and support to keep the heating element out of contact with the support. The support may be configured to reflect infrared radiation emitted by the heating element in a direction toward the heating element, e.g., to help heat the heating element more rapidly to allow emission of infrared radiation.

A variety of additional aspects will be set forth in the description that follows. The aspects can relate to individual features and to combination of features. It is to be understood that both the foregoing general description and the following detailed description are exemplary and explanatory only and are not restrictive of the broad inventive concepts upon which the embodiments disclosed herein are based.

DETAILED DESCRIPTION

Figure 1:
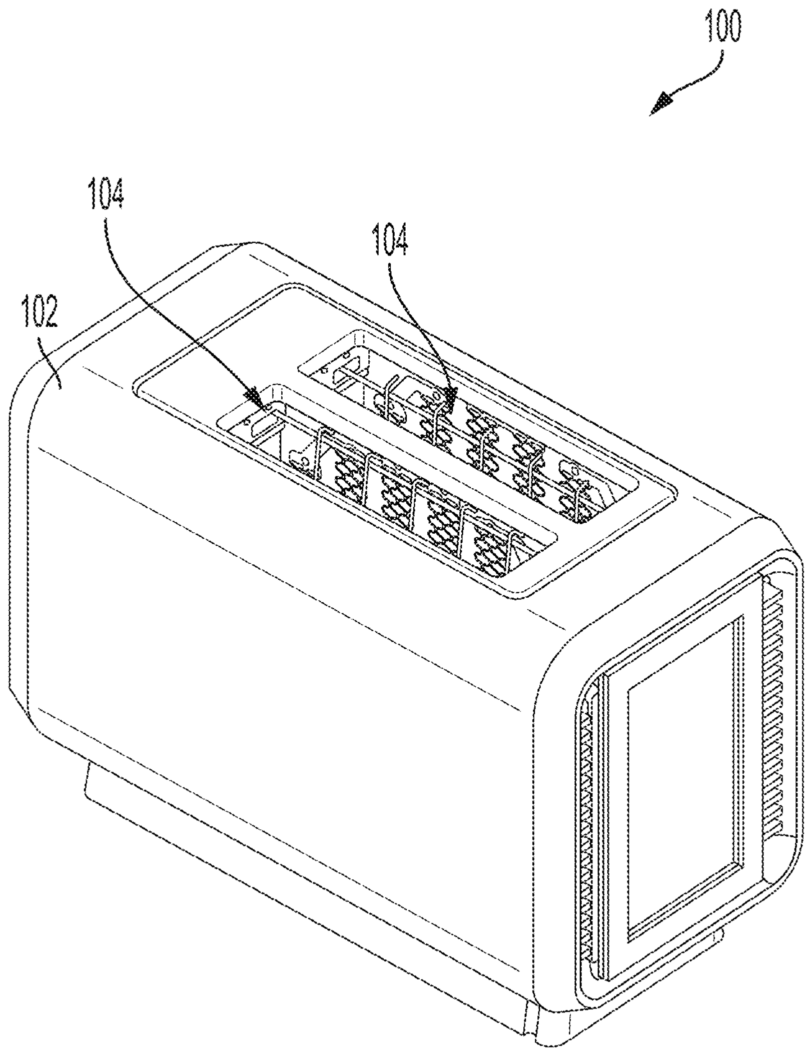
FIG. 1 is a perspective view of a cooking appliance arranged as a toaster in an illustrative embodiment.

Various embodiments will be described in detail with reference to the drawings, wherein like reference numerals represent like parts and assemblies. Reference to various embodiments does not limit the scope of the claims. Additionally, any examples set forth in this specification are not intended to be limiting and merely set forth some of the many possible embodiments for the claims.

FIG. 1 is a perspective view of an illustrative cooking appliance 100 that includes a housing 102 which at least partially encloses one or more cooking cavities 104. In use, food is placed within one of the cooking cavities 104 and is heated by the cooking appliance 100. In this embodiment, the cooking appliance 100 is a toaster, but can take other forms, such as a toaster oven (including, for example, a pizza oven), a microwave oven, an electric grill, a contact cooker (including, for example, a contact grill or griddle), or a slow cooker.

Figure 2:
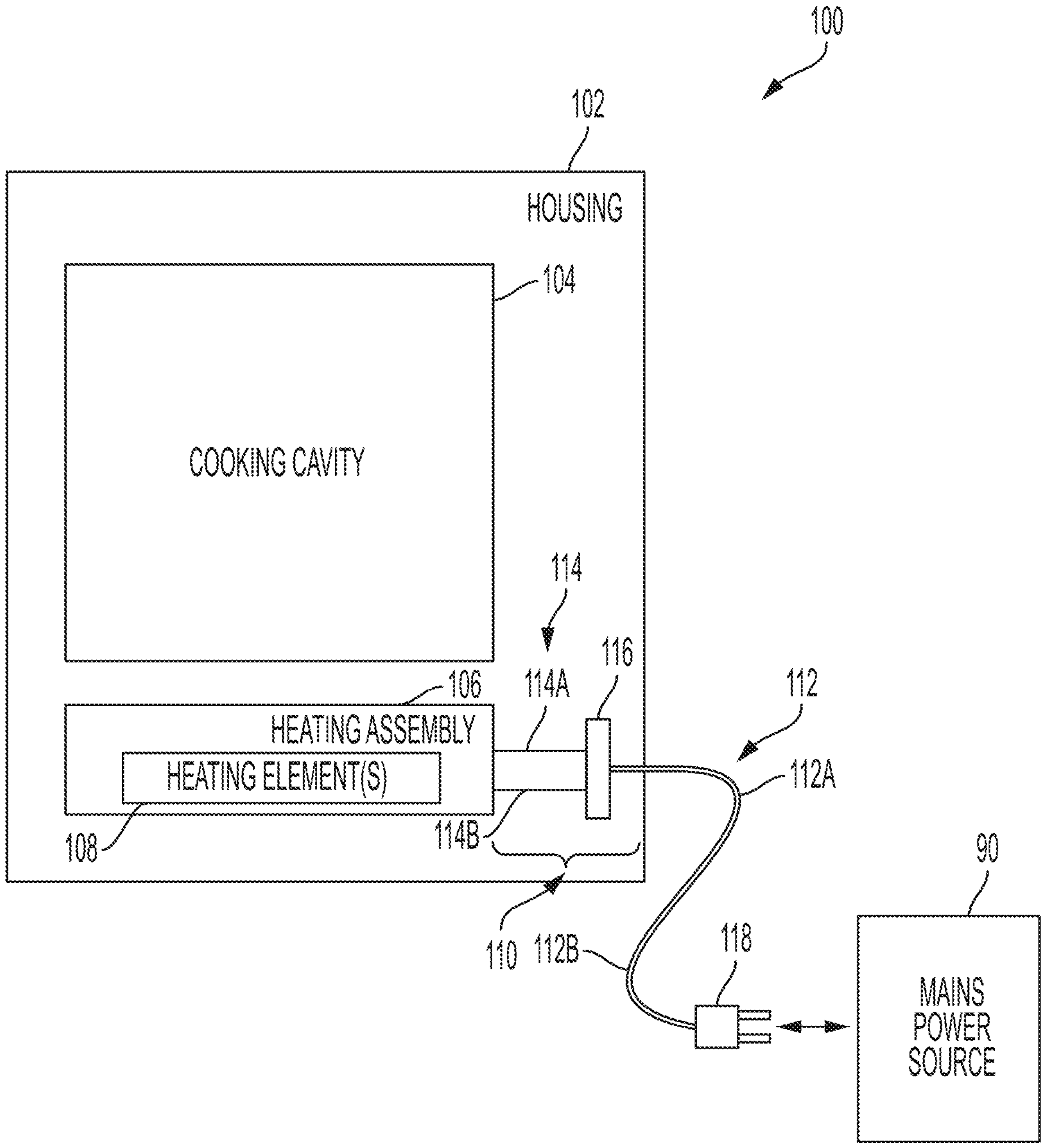
FIG. 2 is a schematic block diagram of an illustrative cooking appliance.

FIG. 2 is a schematic block diagram of selected portions of the cooking appliance 100 and illustrates the housing 102, a cooking cavity 104, a heating assembly 106 including at least one heating element 108, an electrical coupling and control 110, and a power cable 112. In some embodiments, the power cable 112 includes electrical conductors 112A and 112B and a plug 118 which can connect to a mains power source 90, e.g., by connecting the plug 118 to an outlet of the mains power source 90. Thus, the cooking appliance 100 may be powered by the mains power source 90, which may supply alternating current (AC) or direct current (DC) power to the appliance 100 at any suitable voltage (e.g., 6V to 250V), frequency (e.g., 0 Hz to 60 Hz), and current (e.g., 1 A to 100 A or more). The electrical coupling and control 110 may control whether and how electrical power is provided to the heating assembly 106, e.g., the electrical coupling and control 110 may condition or otherwise adjust power received from the power cable 112 and provide the adjusted power to the heating assembly 106 so food is heated in the cavity 104 at a desired rate. For example, the electrical coupling and control 110 could adjust the electrical power from the mains power source 90 by converting AC power to DC power, by switching the power on and off, and/or by adjusting a voltage and/or frequency of the power, and providing the adjusted power to the heating assembly 106. In such a case, the electrical coupling and control 110 may include suitable components such as relays or other switches, a voltage transformer and/or other power regulation electronics, a battery, capacitor or other storage device, etc. to supply a conditioned or otherwise adjusted electrical power from the mains power source 90 to the heating assembly 106. In other embodiments, the electrical coupling and control 110 may directly connect the heating assembly 106 to the mains power source 90. For example, the electrical coupling and control 110 may include electrical conductors 114 (including conductors 114A and 114B) and a coupling 116 to provide electrical power directly from the power cable 112 to the heating assembly 106. The coupling 116 may include a switch or other control device for selectively connecting the heating assembly 106 to the mains power source 90, i.e., to turn on and off the heating assembly 106. For example, a switch can be manually controlled by a user (e.g., by pressing down on a toaster actuator, or by depressing a power button) to provide power to the heating assembly 106, or power to the assembly 106 can be controlled by an electronic control system.

Figure 3:
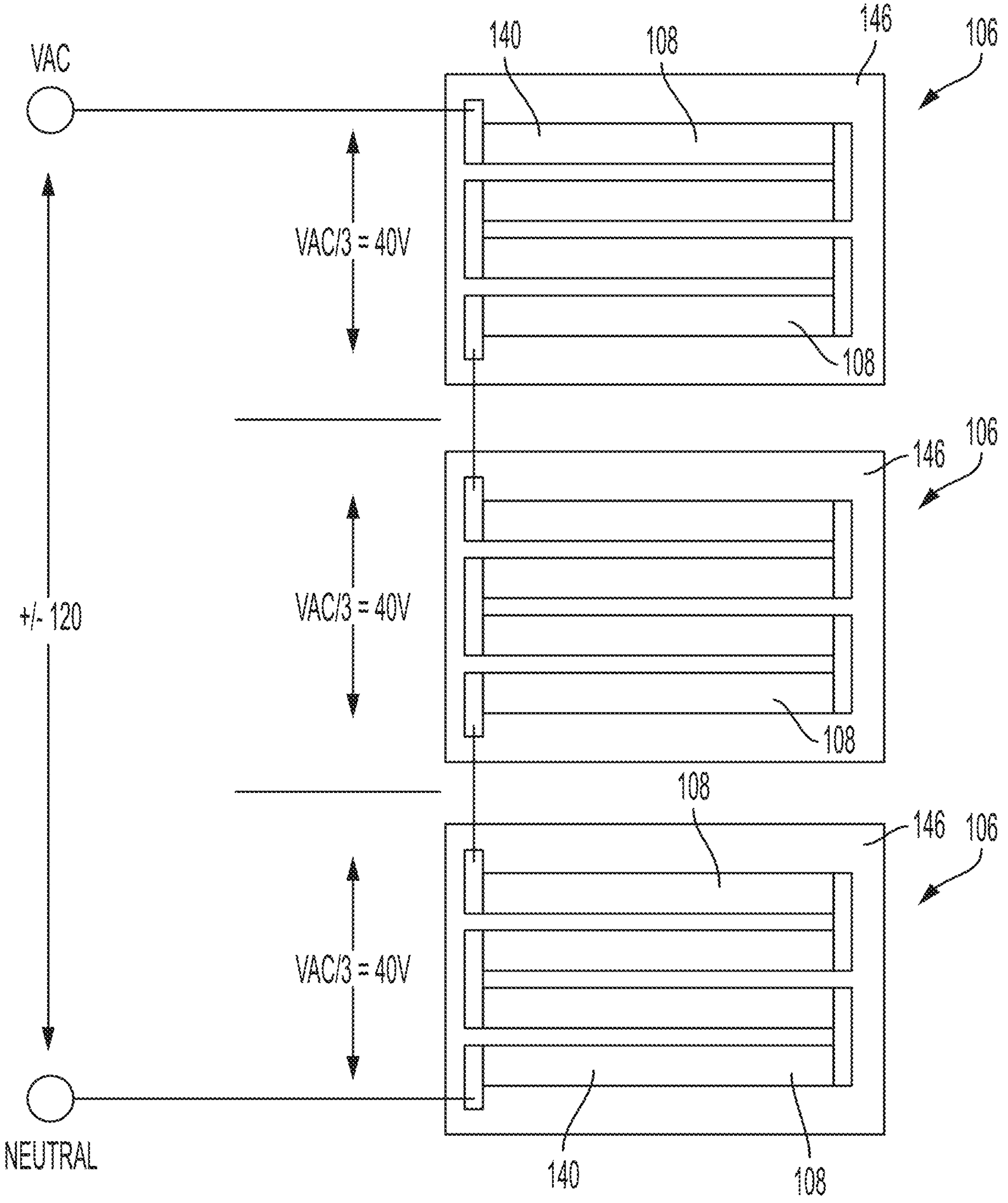
FIG. 3 is a schematic diagram illustrating an example heating assembly arrangement having three heating assemblies.
Figure 4:
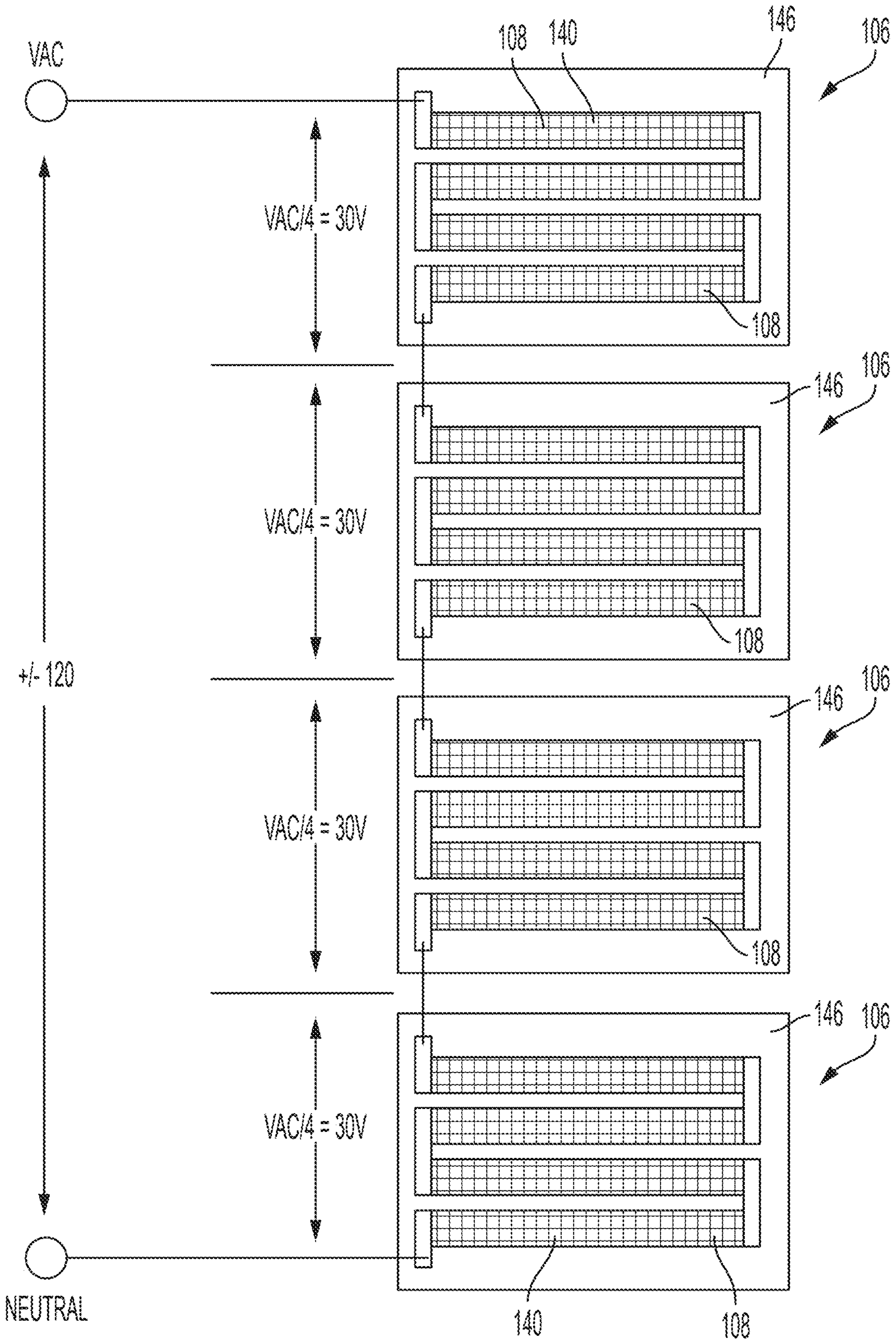
FIG. 4 is a schematic diagram illustrating another example heating assembly arrangement having four heating assemblies.

The heating assembly 106 may include one or more heating elements 108, e.g., electrical resistance heating elements that emit infrared radiation when electrical current is passed through the elements. For example, FIG. 3 shows an arrangement in which a cooking appliance 100 includes three heating assemblies 106, and each heating assembly 106 includes four heating elements 108. FIG. 4 shows another arrangement in which a cooking appliance 100 includes four heating assemblies 106, and each heating assembly 106 includes four heating elements 108. Of course, other arrangements are possible, such as a cooking appliance 100 including one heating assembly 106 having one heating element 108, etc. In short, an appliance 100 may include any suitable number of heating assemblies 106, and each assembly may include any suitable number of heating elements 108. In the embodiments of FIGS. 3 and 4, each heating assembly 106 includes a support 146 to provide structural or mechanical support to the heating elements 108 of the assembly 106. For example, each support 146 may include a sheet of material (e.g., which may be thermally and electrically insulating and/or reflective of electromagnetic energy) to which the heating elements 108 are attached. Alternately, the support 146 may be eliminated and heating elements 108 may support themselves, or the support 146 may be arranged in other ways.

In at least some examples, each heating element 108 is formed as a sheet having a length and a width (which can be seen in FIGS. 3 and 4) as well as a thickness (in a direction perpendicular to the plane of FIGS. 3 and 4). The sheet may have a plurality of openings 140, e.g., so the sheet forms a mesh or screen-type structure. The heating elements 108 may be electrically conductive to at least some extent such that when suitable electrical power is applied across the heating element 108, the heating element 108 generates heat by electrical resistance. For example, current flow in the heating element 108 may cause a temperature of the heating element 108 to increase in at least some areas, causing the heating element 108 generate infrared and/or other electromagnetic radiation. The heating element 108 may be arranged to emit infrared radiation toward the cooking cavity 104 where food is heated by the radiation. Some electromagnetic radiation may be visible, e.g., at temperatures between about 500 and 550 degrees C. (about 1,000 degrees F.) the heating elements 108 may emit visible light as well as infrared radiation. (Although some infrared radiation may be visible to humans at least in some conditions, reference to visible light herein is to electromagnetic radiation that is generally not considered part of the infrared spectrum.) In some embodiments, at least portions of the heating elements 108 have a temperature in a range from about 800 to about 900 degrees C. (e.g., about 850 degrees C.) during operation to heat a food product in the cooking cavity.

As noted above, electrical power may be provided to a heating assembly 106 or set of heating assemblies 106 in different ways. In the example shown in FIG. 3, the heating assemblies 106 are selectively coupled to a power source, e.g., by a switch, such that the assemblies 106 are directly coupled to a mains power source 90. In North America, a mains power source 90 supplies an alternating current (AC) signal typically having a voltage of +/−120 V and a frequency of 60 Hz. In other parts of the world, other signals (such as having different voltages and or frequencies) are used and the heating assemblies 106 can be designed to work with any appropriate mains power source 90, or even a DC power source such as from a battery or utilizing a power inverter. (Alternately, the electrical coupling and control 110 may adjust an input mains power to suit a heating assembly 106). In the example herein, a mains power source 90 that provides a voltage of +/−120 V is discussed for illustrative purposes. As can be seen in FIG. 3, the heating assemblies 106 are connected in series such that the mains power supply of 120V is across all three assemblies 106. Moreover, the heating elements 108 in each assembly 106 are arranged in series as well, and thus all of the heating elements 108 in the three assemblies 106 are arranged electrically in series. This is only one example, however, and other arrangements are possible, e.g., with the heating assemblies 106 arranged in parallel with respect to the power supply, and heating elements 108 in each assembly 106 arranged in series or parallel. In the configuration of FIG. 3, the heating assemblies 106 act as a voltage divider to divide the +/−120V signal across the three assemblies 106 and the assemblies 106 have a same resistance. As a result, each heating assembly 106 has a voltage applied of about 40 V (120V divided by 3 assemblies).

To obtain a desired power output from each heating assembly 106 and/or heating element 108, the heating elements 108 can be designed or otherwise arranged to have a desired resistance. For example, to obtain a power output of 500 Watts from each heating assembly 106 in FIG. 3 (1500 W total from each of the three assemblies 106), the resistance of each heating element 108 may be 0.8 Ohms. That is, as known to those of skill, output power (P) for a heating assembly 106 is equal to the voltage (V) applied across the assembly 106 times the current (I) passing through the assembly 106, i.e., P=V*I. If P equals 500 W, and V is 40V, I equals 12.5 Amps. As is also known in the art, the voltage (V) applied across an assembly 106 equals the current (I) passing through the assembly 106 times the resistance (R) of the assembly 106, i.e., V=I*R. If V=40V and I=12.5 A, then R is 3.2 Ohms. Since the heating elements 108 are arranged in series, the resistances of the heating elements 108 added together should equal 3.2 Ohms to achieve the desired 500 W power output. If each heating element 108 has an equal resistance, each element 108 should have a resistance of 0.8 Ohms (3.2 Ohms divided by four elements 108). Of course, other power outputs and resistance arrangements may be employed in other embodiments. For example, in FIG. 4, to achieve a total power output of 1500 W from the four heating assemblies 106, each heating assembly 106 will output 375 W when a voltage of 30V is applied across it at a current of 12.5 Amps. Thus, each assembly 106 should have a total resistance of 2.4 Ohms, and if the four heating elements 108 of each assembly 106 have an equal resistance, each element 108 should have a resistance of 0.6 Ohms.

As noted above, each heating assembly 106 can have one or more heating elements 108, such as two or more. One benefit of having multiple heating elements 108 and/or heating assemblies 106 in a cooking appliance 100 is that the heating elements and/or assemblies may be positioned in different locations with respect to one or more cooking cavities 104. For example, in a toaster there may be one heating assembly 106 positioned on each side of the cooking cavities 104 so as to heat a slice of bread on each side. In a multi-slice toaster, additional heating assemblies 106 can be used for each cooking cavity. As another example, a toaster oven or microwave can have heating assemblies 106 arranged on the top and bottom of the cooking cavity such that radiative heating may be combined with one or more additional mechanisms such as free/forced convection and microwave. Other embodiments are also possible having various numbers of heating assemblies and/or elements arranged in various possible configurations.

Figure 5:
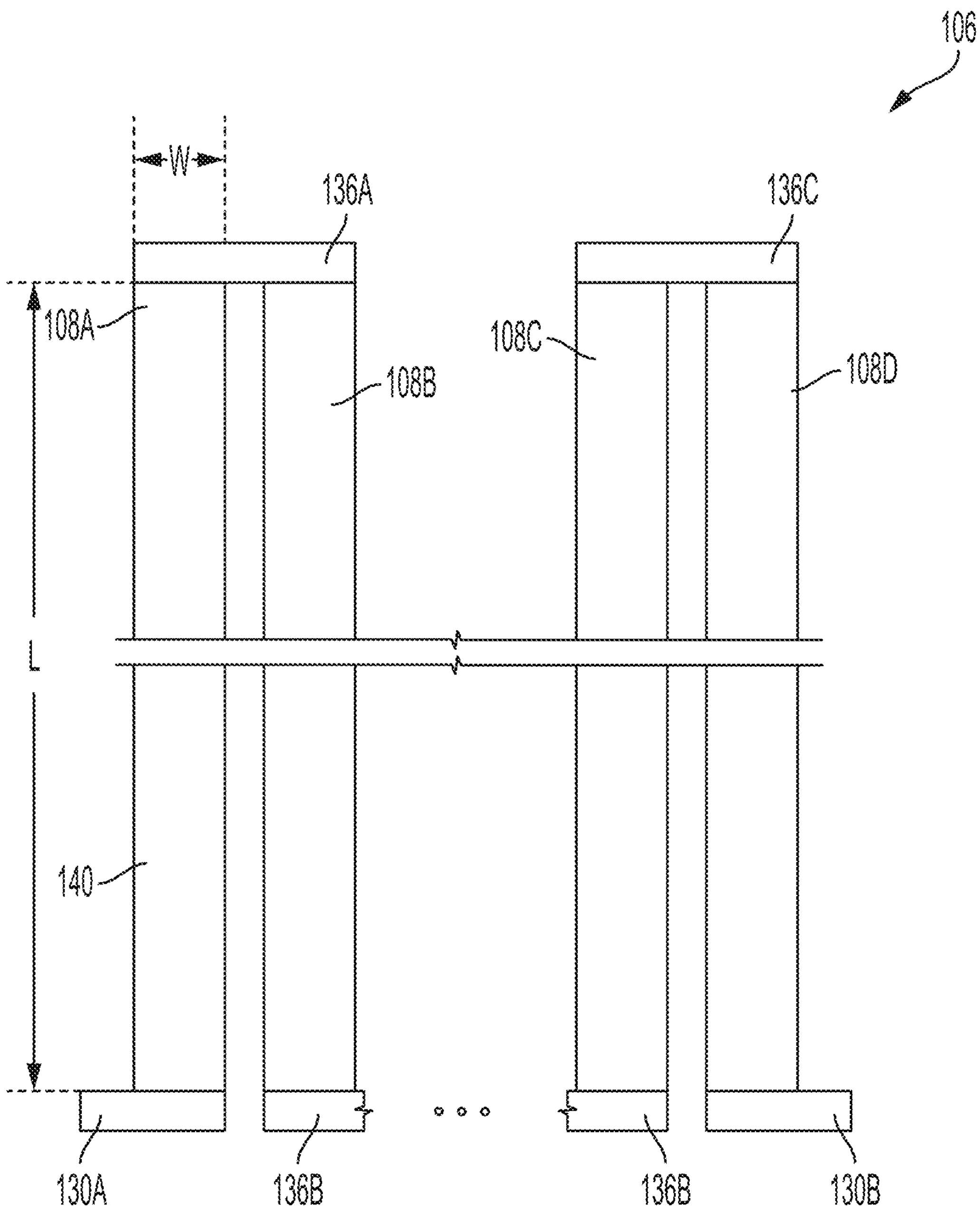
FIG. 5 is a schematic diagram illustrating an example of a heating element configuration for a heating assembly.

FIG. 5 is a schematic diagram of a heating assembly 106 similar to that shown in FIGS. 3 and 4. In this example, the heating assembly 106 includes terminals 130 (including terminals 130A and 130B), heating elements 108 (including elements 108A, 108B, 108C, and 108D), and buses 136 (including buses 136A, 136B, and 136C). FIG. 5 shows four heating elements 108, but the ellipsis represents that embodiments can have more or fewer heating elements 108. The heating elements 108 are electrically arranged in series, and terminals 130A and 130B arranged at each end of the assembly 106 (e.g., electrical input and output ends). The terminals 130 are electrically conductive contact points by which the heating assembly 106 can be connected to a power source. In this example, the terminals 130A and 130B are also each connected to at least one heating element 108, e.g., terminal 130A is connected at one end of heating element 108A and terminal 130B is connected at one end of heating element 108D. The buses 136 are arranged to connect the heating elements 108 in series. In this embodiment, the buses 136 are electrically conductive strips that are connected at ends of adjacent heating elements 108 and act to mechanically support the heating elements 108, and conduct electricity between the adjacent heating elements 108. In this example, bus 136A is connected to ends of heating elements 108A and 108B, bus 136B is connected to ends of heating elements 108B and 108C, and bus 136C is connected to ends of heating elements 108C and 108D. In some embodiments as shown in FIG. 5, the heating assembly 106 has heating elements 108 and buses 136 arranged in a zig-zag shape, although other arrangements are possible.

When a suitable voltage is applied across the terminals 130A and 130B, such as shown in FIGS. 3 and 4, the heating elements 108 generate infrared and/or other electromagnetic radiation. Thus, the heating elements 108 may be formed of, or otherwise include, a conductive material such as a metal that is heated by electrical resistance. In one example, the heating elements 108 may be made of an alloy of at least nickel and chromium, also known as Nichrome, although other materials or combinations of materials are possible. For example, heating elements 108 may be made of an electrically insulating material that is coated with a suitably conductive material. The electromagnetic power output of a heating element 108 can be adjusted in different ways, such as by varying the material(s) used in the element 108, adjusting the length L, width W and/or thickness T of the heating element 108 (thickness T is a dimension of the heating element 108 is a direction perpendicular to the plane of FIG. 5), varying the size and/or shape of openings 140 in the element 108, varying the cross sectional area of conductive portions of the element 108 (e.g., portions that define the openings 140), and other characteristics. In some cases, a ratio of the length L to width W may be adjusted to vary power output of an element 108, e.g., power output may be decreased (or increased) by increasing (or decreasing) the length L and/or decreasing (or increasing) the width W.

Figure 6:
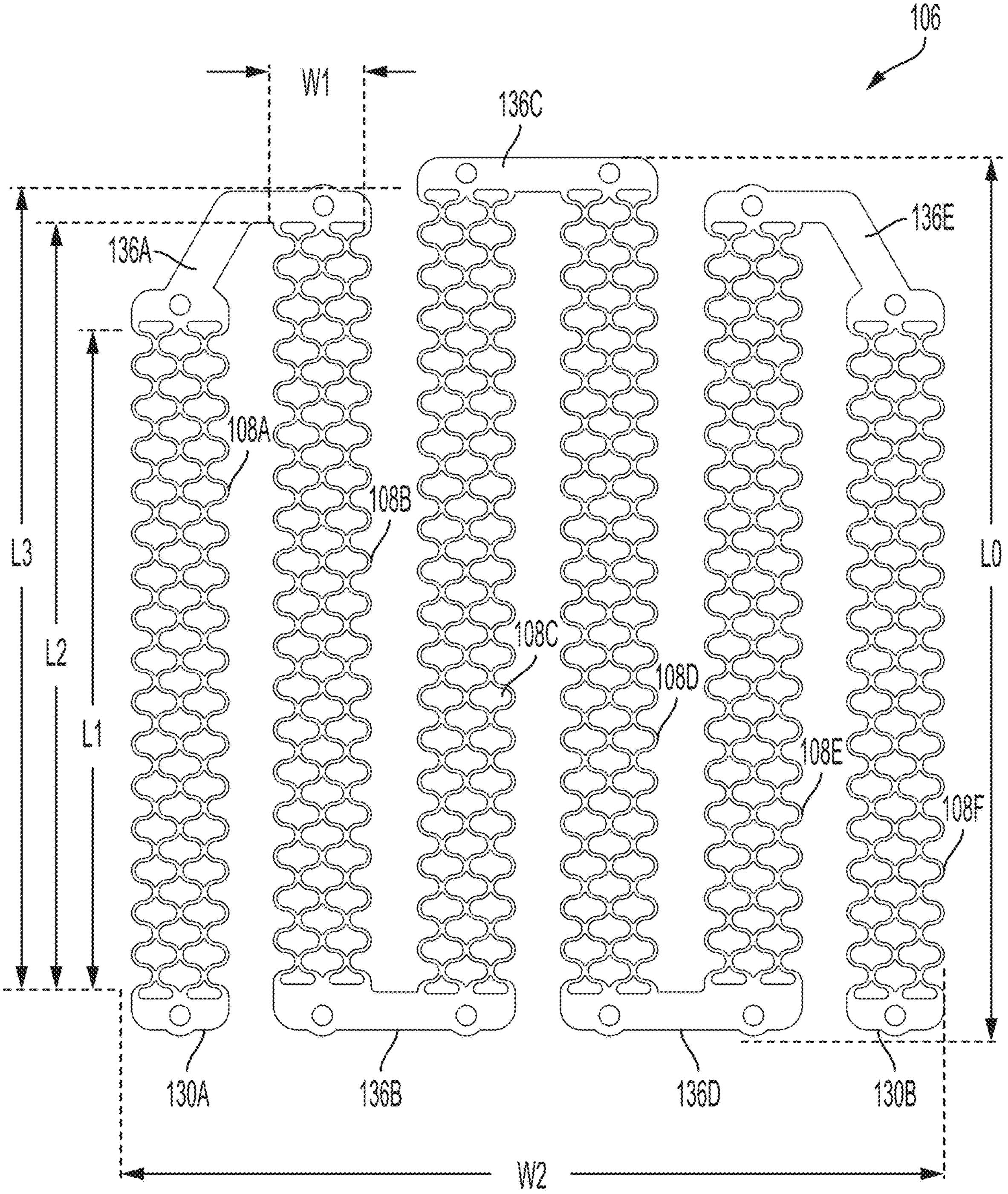
FIG. 6 is a front plan view of another example heating element configuration for a heating assembly.
Figure 7:
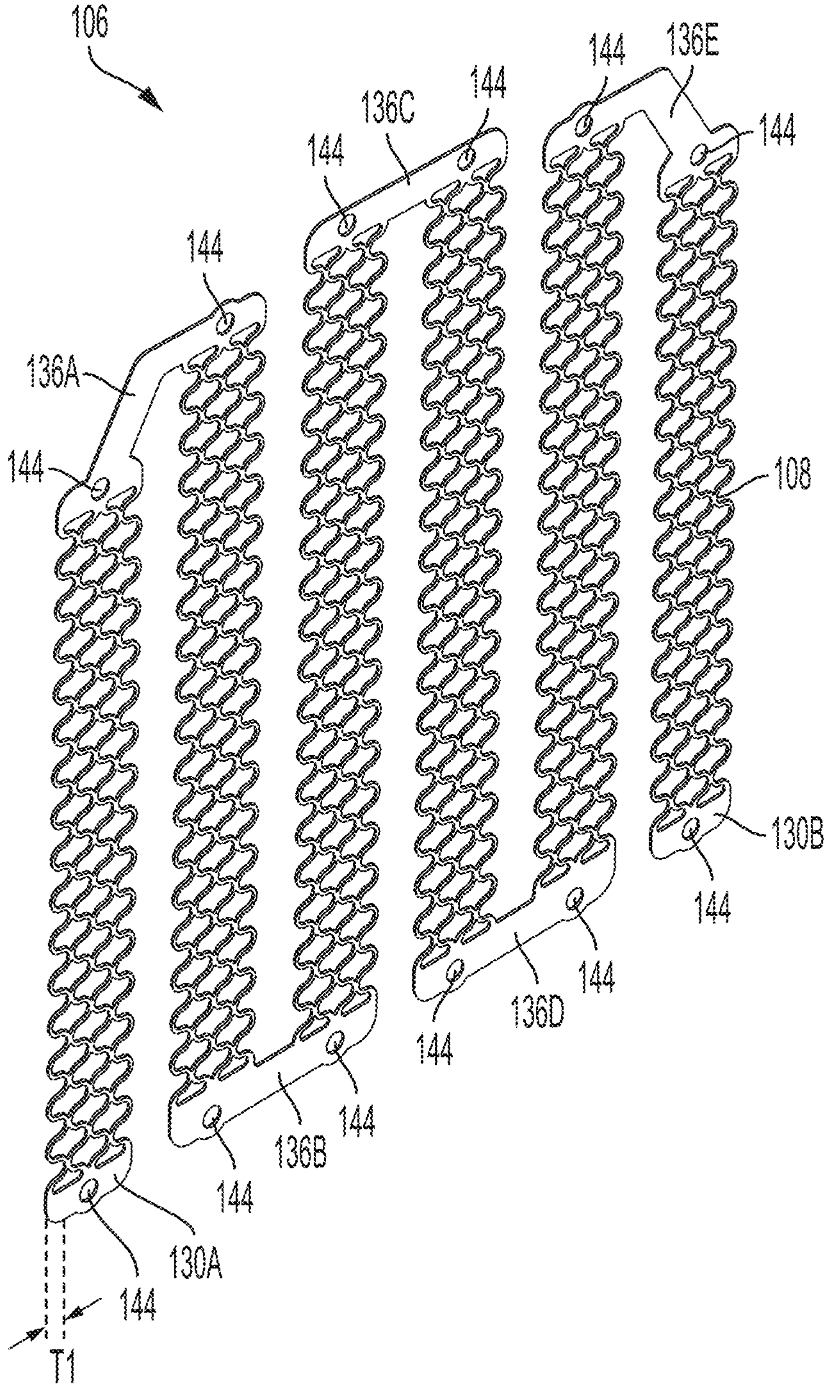
FIG. 7 is a perspective view of the FIG. 6 heating element configuration.

While in the FIG. 5 embodiment the heating elements 108 each have a length L and width W that are the same, heating elements 108 in a heating assembly 106 may be arranged in any suitable way. For example, FIGS. 6 and 7 show an example in which a heating assembly 106 includes six heating elements 108 where one set of two elements 108A, 108F have a length L1, another set of two elements 108B, 108E have a length L2 and a third set of two elements 108C, 108D have a length L3. This arrangement of different heating element 108 lengths (or widths or other dimensions or shapes) may be used for different purposes, e.g., to emit infrared radiation over an area having a desired shape or size. For example, the heating element arrangement in FIGS. 6 and 7 may emit radiation in a shape that corresponds to a shape of a piece of bread that is toasted by the heating assembly 106. In this embodiment, the heating elements 108 each have a same width W1 and thickness T1, but these dimensions may be varied as desired. Similar to the FIG. 5 embodiment, the heating assembly 106 of FIGS. 6 and 7 includes terminals 130 (including terminals 130A and 130B) at input and output ends of the assembly 106, and buses 136 (including buses 136A-E) connected to respective ends of adjacent heating elements 108 so the elements 108 are arranged in a zig zag pattern. Of course, other numbers of heating elements 108, buses 136, etc. are possible. As in the FIG. 5 embodiment and other embodiments herein, the terminals 130 and buses 136 may have a suitably low resistance relative to the heating elements 108 such that the terminals 130 and buses 136 are not heated by current flow through the heating assembly 106 to any great extent, e.g., such that the terminals 103 and buses 136 do not emit infrared radiation to a significant degree.

In the embodiment of FIGS. 6 and 7, the heating assembly 106 has a total width W2 and total length L0. The total width W2 may be greater than the sum of the widths W1 of the heating elements 108. In certain examples, the total width W2 of the heating assembly may be about 35% to about 45% greater than the sum of the widths W1 of the heating elements. For example, the total width W2 may be about 2 inches to about 18 inches, or in a range from about 3 inches to about 12 inches, or in a range from about 4 inches to about 6 inches.

The length of each heating element 108 (e.g., L1, L2, or L3) may be greater than the width W2 of each heating element 108. For example, the ratio of the lengths L1, L2, L3 to the width W2 can be selected to obtain a desired power output, current flow, and/or resistance for each heating element 108. In some examples, the heating elements 108 each have a width W2 in a range from about 0.1 inches to about 6 inches, or in a range from about % inch to about 1 inch. In some examples, the width W2 is about H inch. In some examples, the lengths L1-L3 of the heating elements 108 may range from about 2 inches to about 12 inches, or may range from about 3 inches to about 8 inches. In certain examples, the length L1 of the first set of heating elements is about 70% to about 90% of the length L3 of the third set of heating elements. In certain examples, the length L2 of the second set of heating elements is about 80% to about 99% of the length L3 of the third set of heating elements. In certain examples, the thickness T1 is in a range from about ⅛ mm to about ⅜ mm, or about ¼ mm.

In the example depicted in FIGS. 6 and 7, the bus 136A which connects heating elements 108A and 108B has an elbow or bent shape for accommodating the different lengths L1, L2 between these heating element segments. The bus 136E which connects heating elements 108E and 108F also has an elbow or bent shape for accommodating the different lengths L1, L2 between these heating elements. Buses 136B, 136C, and 136D each have a straight or linear shape for connecting adjacent heating elements 108 (e.g., heating elements 108B and 108C, heating elements 108C and 108D, and heating elements 108D and 108E). In certain examples, the shapes of the terminals 130 (e.g., terminals 130A-B) and the buses 136 (e.g., buses 136A-E) may vary.

The buses 136A-E and the terminals 130A, 130B may each include one or more apertures 144 by which the heating elements 108 can be mechanically supported. In certain examples, electrically insulated mechanical supports are engaged with the apertures 144 to hold the terminals 130 and buses 136, and thus the heating elements 108, in a desired position with respect to a cooking cavity 104 of an appliance 100. In some examples, the engagement of the mechanical supports with the apertures 144 may support the heating elements 108 so that the heating element can thermally expand and contract without placing stress on the heating element 108. For example, the heating elements 108 may be supported so that the elements 108 can freely change dimension along the length L and/or width W (i.e., in directions parallel to a plane of the heating element) with temperature variations of the element 108.

Figure 8:
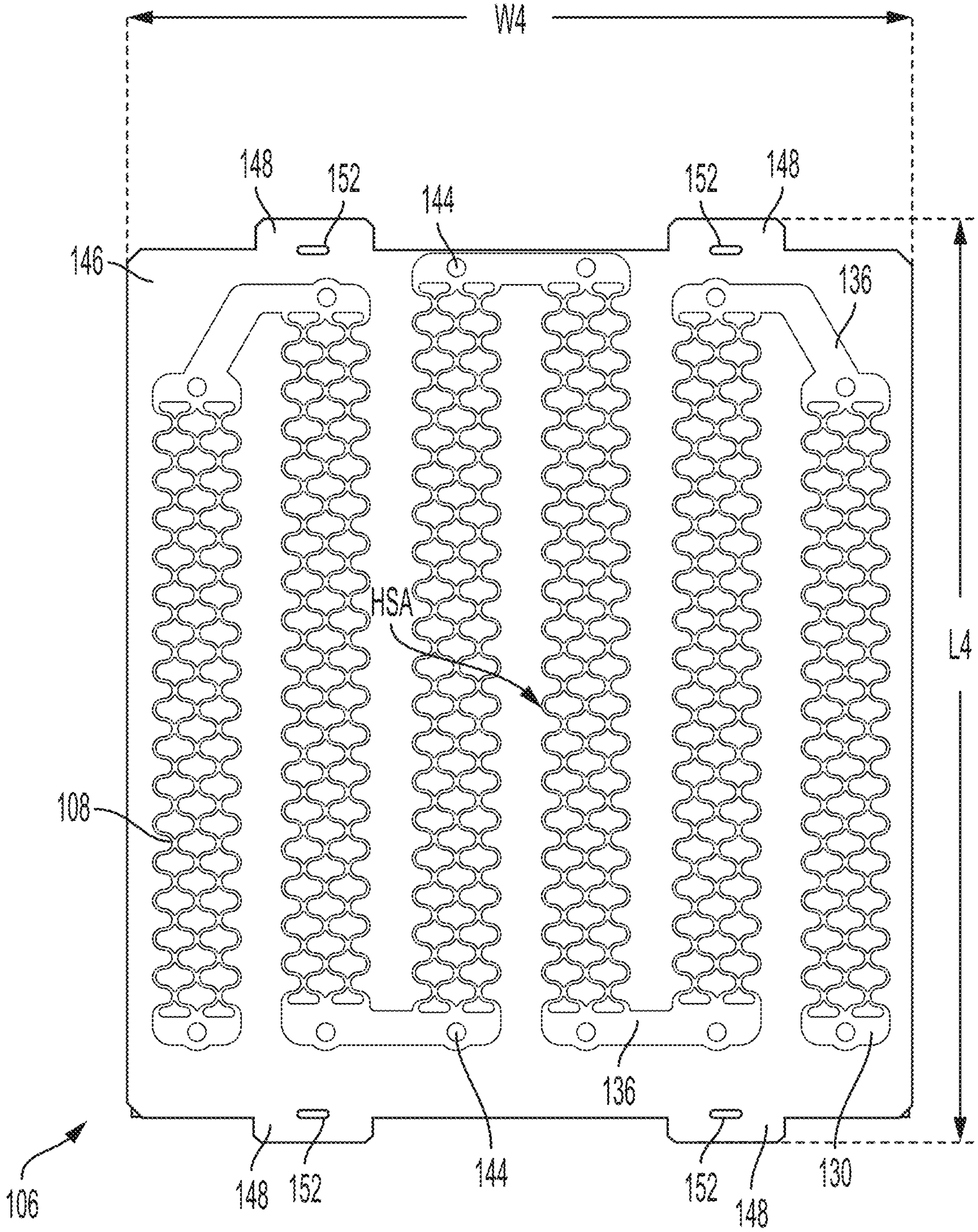
FIG. 8 is a front plan view of a heating assembly including the FIG. 5 heating element configuration attached to a support.
Figure 9:
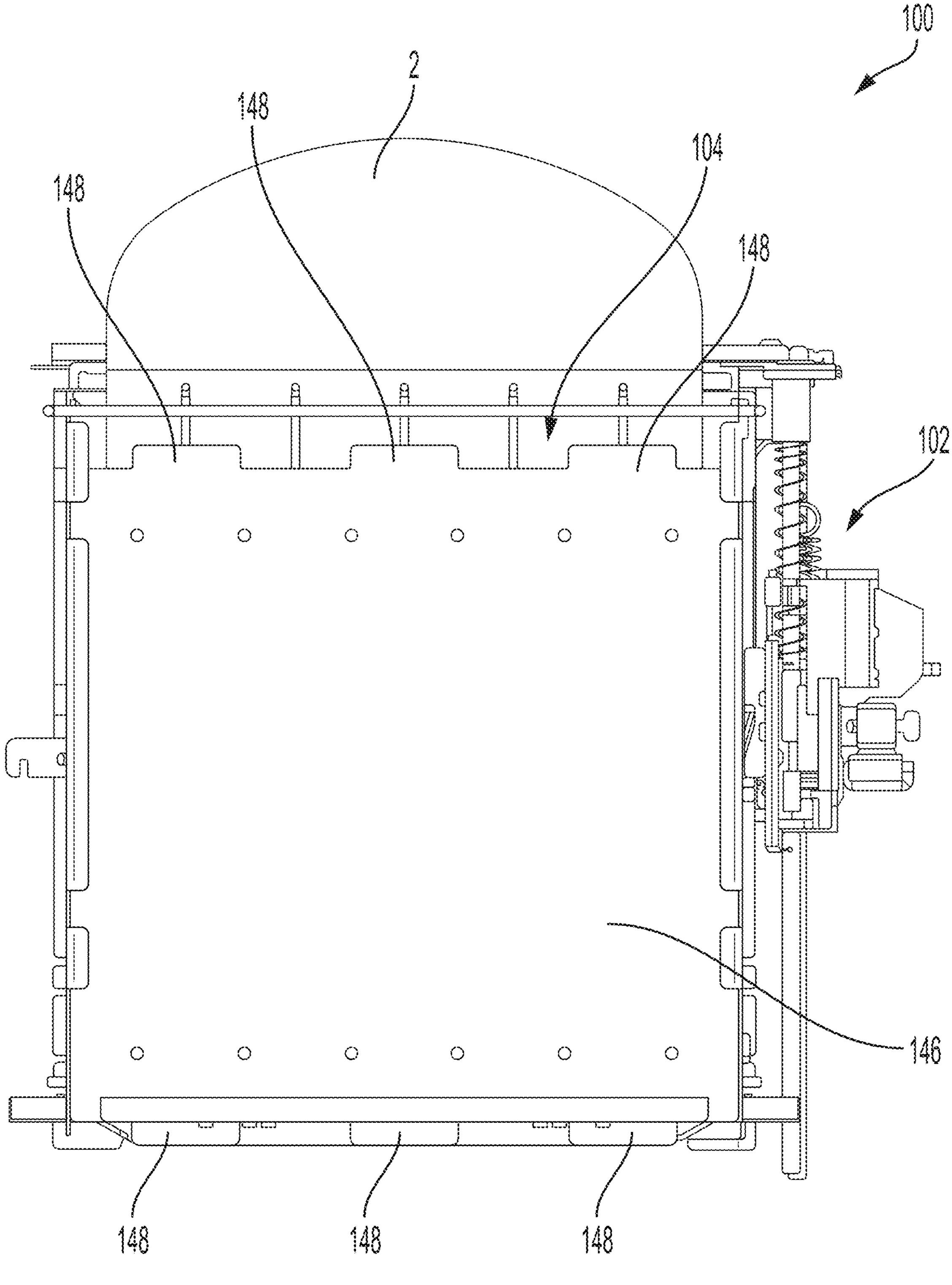
FIG. 9 is a rear plan view of the FIG. 8 heating assembly in a cooking appliance.
Figure 10:
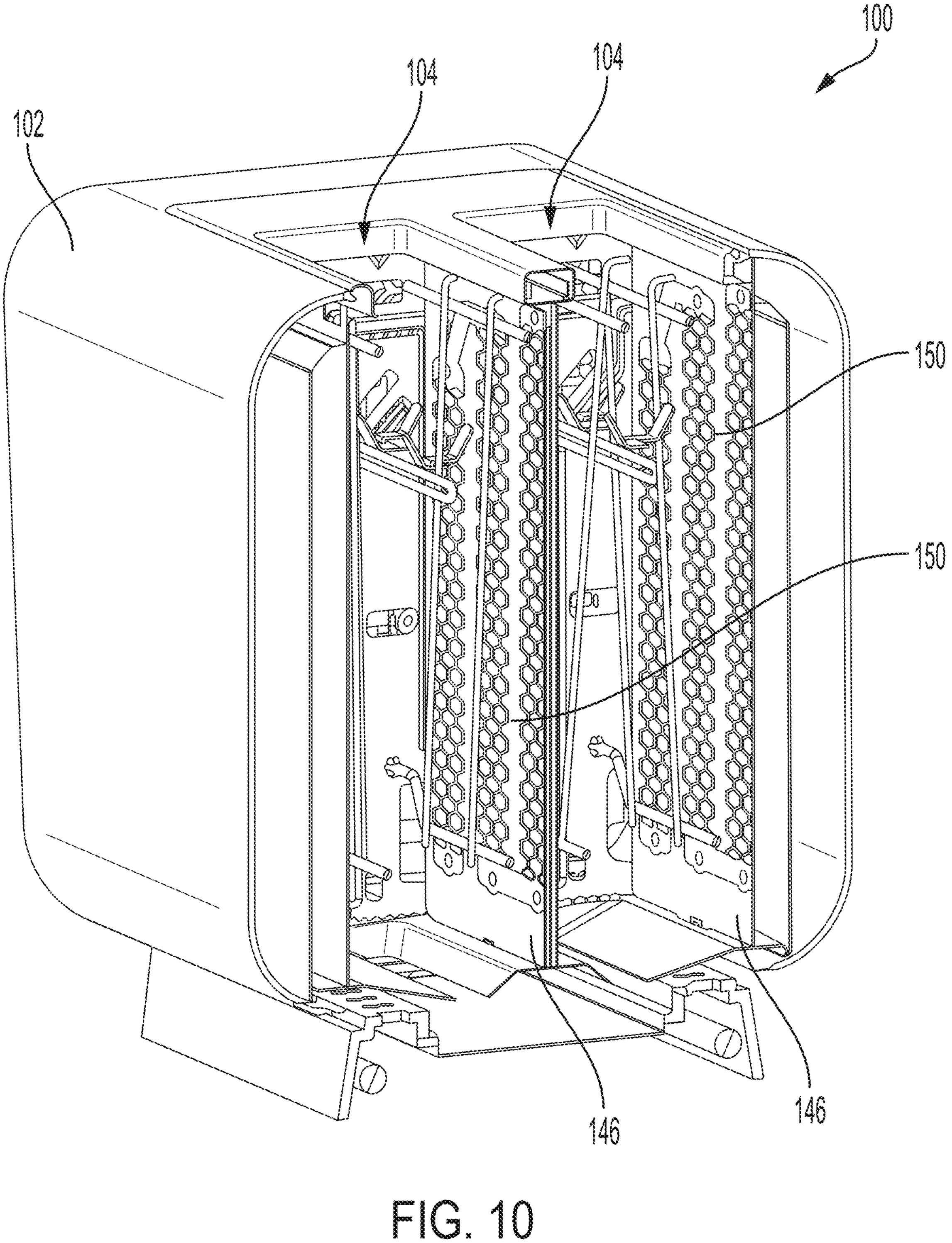
FIG. 10 is a front sectional view of a cooking appliance that includes the FIG. 8 heating assembly.

In some embodiments, one or more heating elements 108 may be attached to a support that provides physical support to the heating elements 108, and may provide other functions such as reflecting electromagnetic radiation emitted by the heating elements 108 toward a cooking cavity, causing the heating elements 108 to take or maintain a particular shape, and/or helping to keep heat within a cooking cavity 104. For example, FIGS. 8-10 show an embodiment in which a heating assembly 106 including the heating element arrangement of FIGS. 6 and 7 has a support 146. Although the support 146 may be arranged in various different ways, in this embodiment the support 146 is formed from a sheet of flexible material, such as a sheet of dielectric material like phlogopite high temperature mica or similar materials having a thickness of about 0.015 to about 0.045 inches. In some embodiments, the support 146 may be electrically insulating and/or thermally insulating, although this is not required. For example, a support 146 could be made of, coated with, or otherwise include an electrically conductive metal or other material. In some embodiments, the support 146 may be reflective of at least some wavelengths of electromagnetic radiation emitted by the heating elements 108, such as infrared radiation emitted by the elements 108. This may allow the support 146 to reflect infrared radiation that is emitted by a heating element 108 in a direction toward a cooking cavity 104 and/or toward the heating element 108. In this embodiment, the support 146 is thermally insulating and reflective of infrared radiation. As a result, the support 146 tends to absorb relatively little heat from the heating elements 108, and tends to reflect or otherwise emit infrared radiation toward a cooking cavity 104 and the heating element 108. That is, the heating elements 108 may be positioned between the support 146 and the cooking cavity 104 so that infrared radiation emitted by the heating elements 108 in directions away from the cooking cavity 104 may be reflected by the support 146 back toward the cooking cavity 104 and the heating elements 108. The reflected infrared radiation not only makes heating of a food product in the cavity 104 more efficient, but also helps to heat the heating elements 108, allowing the elements 108 to heat up more quickly and to generate additional infrared radiation. In some embodiments, the heating elements 108 may be out of contact with the support 146 at portions along the length and/or width of the heating elements 108, e.g., at portions between longitudinal ends of the heating element. Thus, the heating elements 108 may be mostly out of contact with the support 146, reducing heat loss to the support 146 by conduction. Additionally, the support 146 may provide both thermal and electrical insulation in the cooking appliance 100 such that heat tends to remain in the cooking cavities 104, and electrical current in the heating elements 108 is not conducted to the housing 102 of the cooking appliance 100. The support 146 may also, or alternately, provide physical support to the heating elements 108 so the elements 108 maintain or take on a particular shape. As discussed more below, the support 146 and heating elements 108 may be flexed or otherwise bent to take on a curved shape, e.g., so radiant energy can be focused toward a cooking cavity 104. The support 146 may aid in keeping the heating elements 108 in a desired shape.

In some embodiments, the heating elements may be attached to the support so that the heating elements are movable relative to the support at least in one or more directions, e.g., in directions parallel to a plane of the heating elements. For example, the heating elements 108 may have a sheet-type configuration with an elongated shape like that shown in FIG. 8 and may be movable along a length and/or width of the heating element relative to the support 146. Such relative movement may be caused by thermal expansion and/or contraction of the heating elements 108 (e.g., the heating elements 108 may have a coefficient of thermal expansion that is greater than the support 146 and/or otherwise move to a greater or lesser extent than the support 146 with increase in temperature) or caused by physical distortion of the support 146 and/or heating elements 108 (e.g., when the heating assembly 106 is mounted in a cooking appliance 100). As a result, the heating elements 108 may be able to maintain or otherwise take a desired physical shape even with heating/cooling of the elements 108 and/or physical distortion of the support 146. This may help ensure the heating elements 108 emit radiation toward a cooking cavity 104 in a desired way and/or are not damaged during use of the heating assembly 106. The heating elements 108 may be attached to the support 146 in different ways to allow for relative movement, and in this embodiment rivets or other fasteners may be fixed to the support 146 and extend through the apertures 144 so that the heating element 108 can move vertically and/or laterally (as viewed in FIG. 8). For example, the apertures 144 may be sized and/or shaped (e.g., formed as slots) so that a heating element 108 can move along its length (vertically) and/or along its width (horizontally) relative to the rivet or other fastener engaged at the aperture 144. Other arrangements are possible for attaching a heating element 108 to a support 146, as discussed more below.

A heating assembly 106 like that in FIG. 8 may be used in a variety of different cooking appliances. For example, FIG. 9 shows the heating assembly 106 employed in a cooking appliance 100 arranged as a toaster with a slice of bread 2 partially inserted in a cooking cavity 104 (e.g., a bread slot of the toaster). FIG. 10 shows a front cross-sectional view of the cooking appliance 100 that includes two cooking cavities 104 each accessible via a bread slot at a top of the appliance housing 102. Each cooking cavity 104 has a pair of heating assemblies 106 positioned on opposite sides of the respective cooking cavity 104. That is, the heating assemblies 106 are arranged so that the heating elements 108 of each assembly 106 are positioned between the corresponding support 146 and the cooking cavity 104. Accordingly, in the example of FIGS. 9 and 10, the cooking appliance 100 includes four heating assemblies 106 with a total of four supports 146 and 24 heating elements 108. The heating assemblies 106 may be secured in the housing 102 of the appliance 100 in different ways, such as by fasteners, clips, etc. In this embodiment, the supports 146 include several tabs 148 along the top and bottom (and optionally the sides) that secure the support 146 to the chassis of the cooking appliance 100. As an example, each tab 148 may be inserted into a corresponding slot of the chassis of the appliance 100 so the support 146 is held in place by the chassis. Each tab 148 may include an aperture 152 that can receive a fastener for securing the support 146 to the housing 102 of the cooking appliance 100, although this is not required. In FIG. 8, the support 146 is depicted as having a length L4, which may be about 5.5 to about 6.5 inches, and a width W4 which may be about 4.5 to about 5.5 inches. Of course, these dimensions may be suitable for a toaster like that in FIGS. 9 and 10, but may be varied depending on the application.

In some embodiments, the heating elements 108 may be sized, shaped and/or otherwise configured to present an optimized heating surface area (HSA) for a cooking cavity 104. For example, as can be seen in FIG. 8, the arrangement of the heating elements 108 provides an optimized heating surface area HSA that has a general shape of a piece of bread to be toasted or otherwise cooked in a cooking cavity 104. In this embodiment, the heating surface area HSA is defined by the lengths, widths and relative positions of the heating elements 108, e.g., so that the heating surface area HSA may match the shape of a typical piece of toast having a square or rectangular bottom and a rounded top. Thus, the heating elements 108 may allow the appliance to operate more efficiently because infrared energy is emitted only toward areas where food is present, and not where no food is located. Of course, a heating surface area HSA is not limited to a "bread" shape as in FIG. 8, but other shapes and configurations are possible, such as a "pizza" or triangular shape, a "bagel" or round shape, etc. Also, although the cooking appliance 100 in FIGS. 9 and 10 is depicted as a toaster having two cooking cavities 104, it is contemplated that the heating assemblies 106 in this and other embodiments may be used in different types of cooking appliances including toaster ovens, pizza ovens, microwave ovens, electric grills, contact cookers (including, for example, contact grills or griddles), or slow cookers having one or more cooking cavities 104.

Figure 11:
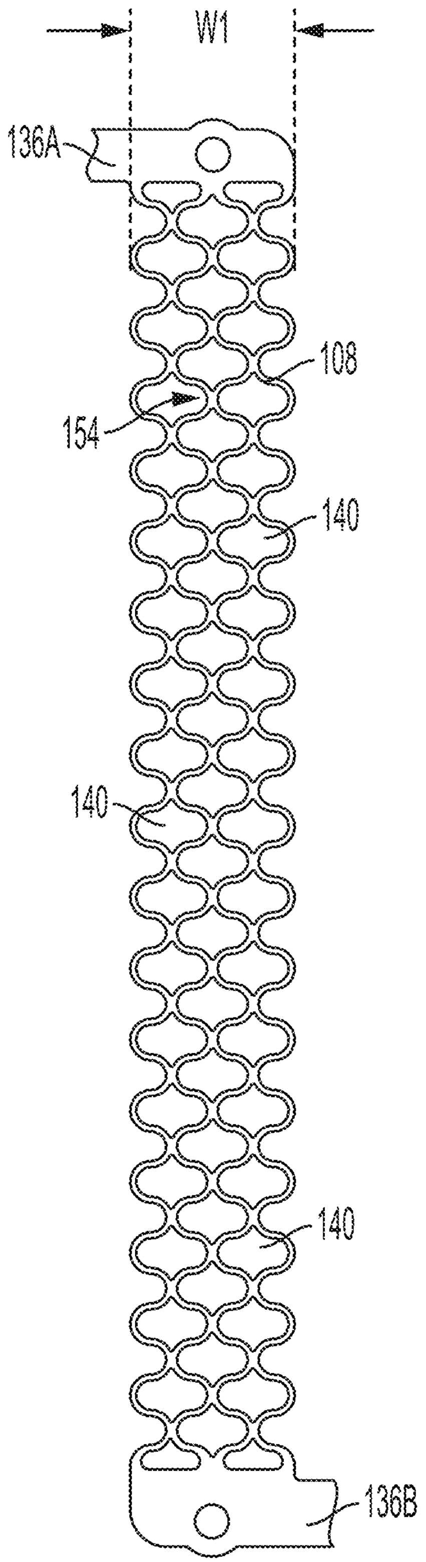
FIG. 11 is an enlarged view of a heating element in the FIG. 8 heating assembly.
Figure 12:
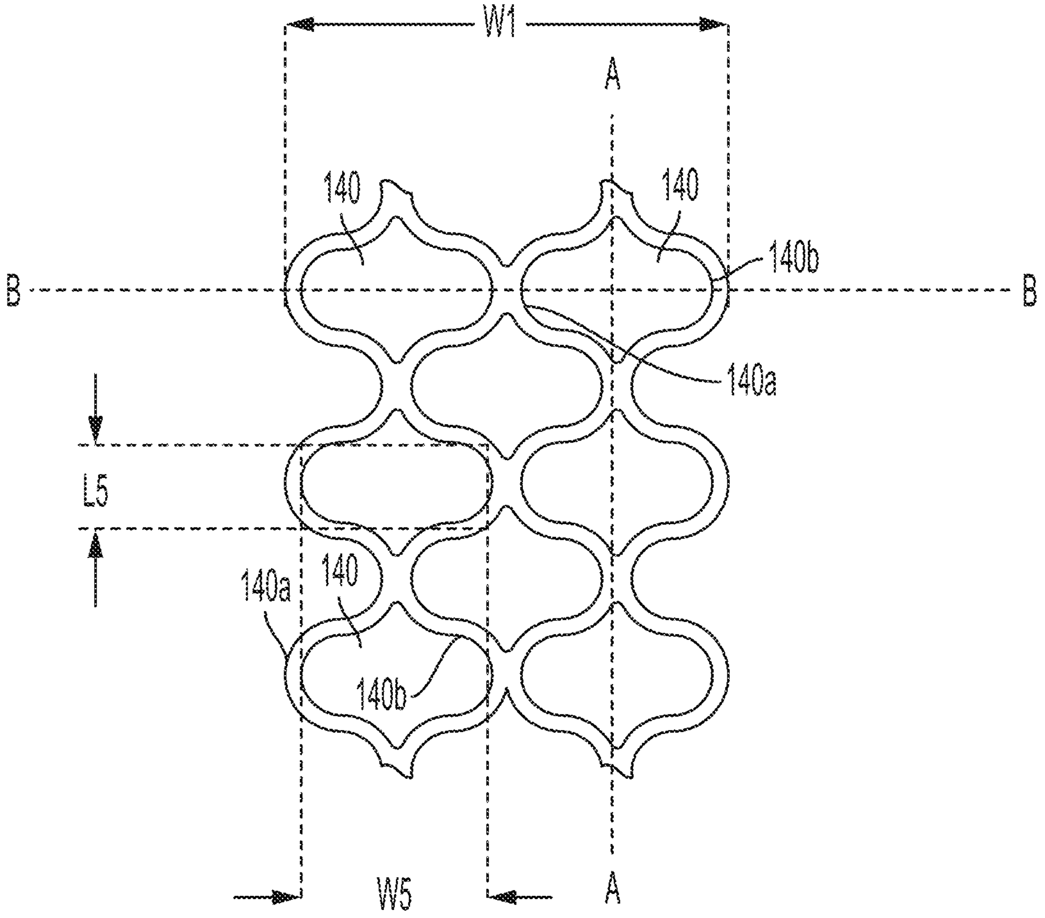
FIG. 12 is another enlarged view of a portion of the heating element shown in FIG. 11.

In the embodiments of FIGS. 6-10, the heating elements 108 are arranged to define a sheet having a length and width, e.g., generally having a rectangular outer shape, and having a plurality of openings formed in the sheet. FIG. 11 shows an enlarged view of a heating element 108 in these embodiments extending between the bus 136A and the bus 136B. The heating element 108 has a repeating pattern 154 that defines a plurality of openings 140 which are spaced apart from one another in the repeating pattern 154. In some examples, the repeating pattern 154 defines two columns of openings 140 and a nested third column of openings 140 that overlaps and/or is arranged between the first two columns of openings 140. However, other arrangements are possible, e.g., including a single column of openings 140. As can be seen in FIG. 12, the openings 140 each have an elliptical shape such that they are substantially oval or circular. For example, each opening 140 includes first and second walls 140*a*, 140*b* that are curved and that flare out in opposing directions along a vertical axis A-A. In this manner, each opening 140 is separated along the vertical axis A-A from another opening 140. Additionally, each opening 140 is linked to an opposing wall 140*a*, 140*b* of an adjacent opening 140. Each opening 140 is symmetrical about both the vertical axis A-A and the horizontal axis B-B. Portions of the heating element 108 that define the walls 140*a*, 140*b* are electrically conductive to at least some extent and are heated by electrical current so that infrared radiation is emitted. The shape of the heating element portions that define the openings 140 increases the current path between the buses 136 or other ends of the heating element 108, so that suitable voltage and/or current may be used to heat the heating element 108. That is, the shape and size of portions of the heating element 108 that define the openings 140 may be adjusted to provide a desired infrared output for a desired voltage and/or current for the heating element 108. In some cases, the shape of the openings 140 may provide a complex or otherwise suitable resistance path to help reduce hot spots or other unwanted temperature variations in different areas of the heating element 108. In this embodiment as depicted in FIG. 12, the openings 140 may each have an individual width W5 from about 0.20 inches to about 0.35 inches, and a length L5 from about 0.06 inches to about 0.16 inches.

In certain examples, the heating elements 108 of all or part of a heating assembly 106 defines a single sheet of material, e.g., such that the terminals 130 (e.g., including terminals 130A and 130B), heating elements 108, and buses 136 (e.g., including buses 136A-E) are all continuous or unitary with one another. Accordingly, separate elements or pieces need not be used for connecting the terminals 130, heating elements 108, and buses 136 since they are all part of a same continuous sheet of material. By forming the terminals 130, heating element(s) 108, and buses 136 all from a single sheet of material, the heating assembly 106 need not have any joints where separate pieces need to be fastened together. This may be advantageous for several reasons. One benefit is that joints may be a potential source of failure because a joint can oxidize over time with exposure to electricity and/or oxygen. Oxidation may reduce conductivity at that point, reducing the amount of current that can flow and creating a cold spot. Eliminating joints may therefore improve the operation and reduce the chance of undesirable oxidation occurring. Another benefit is that the components (terminals, heating elements, and/or buses) are all connected together at fabrication, eliminating any additional steps to connect components together. However, in other arrangements, terminals, heating elements and/or buses may be made separately from each other, and electrically and/or physically attached to form a heating assembly 106. In certain examples, the heating elements 108 each define a single sheet of Iron-Chrome-Aluminum alloy, an alloy of at least nickel and chromium, known as Nichrome, or similar material.

To form a heating element 108, whether including terminals, buses or not, a sheet of suitable material may be cut from a roll or other source and processed. In certain examples, the sheet may be processed using photolithography to remove unwanted portions of the sheet by an etching process, e.g., to form the openings 140. For example, the photolithography process may include the steps of applying a photoresist material onto a surface of a sheet, aligning a photomask having a suitable pattern over the photoresist, exposing the photoresist to ultraviolet light or other suitable illumination through the photomask, and removing the portions of the photoresist exposed (or not exposed) to illumination. For example, chemical etching may be performed to remove those portions of the sheet of material that are not protected by the remaining photoresist. The remaining photoresist may then be removed. In certain examples, the sheet of material may be etched from both sides simultaneously. In some cases, a photolithography process may optimize the structure of the heating element 108 by imparting a continuous and smooth transition between the terminals 130, heating elements 108, and/or buses 136. This may improve current flow through the heating element 108, and accordingly, improve the performance of the heating element 108 so that the heating element 108 reaches suitably high temperatures in less time. In another possible example, other techniques such as machining and/or punching are used to form the terminals 130, heating elements 108, and/or buses

136 from a single sheet of material. For example, machining or cutting can be performed by a computer numerical control (CNC) router or similar machine.

Figure 13:
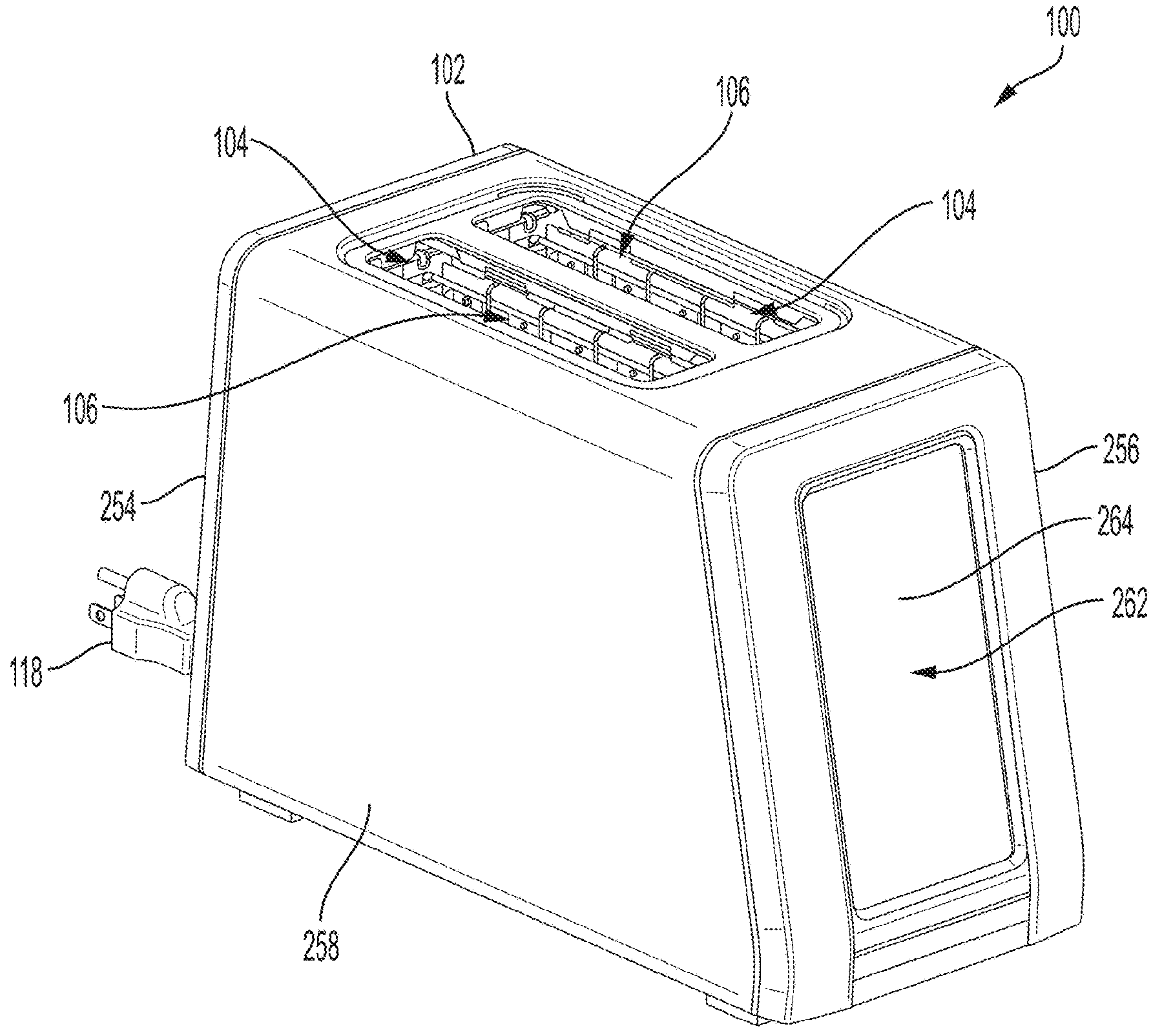
FIG. 13 is a perspective view of another illustrative cooking appliance arranged as a toaster.
Figure 14:
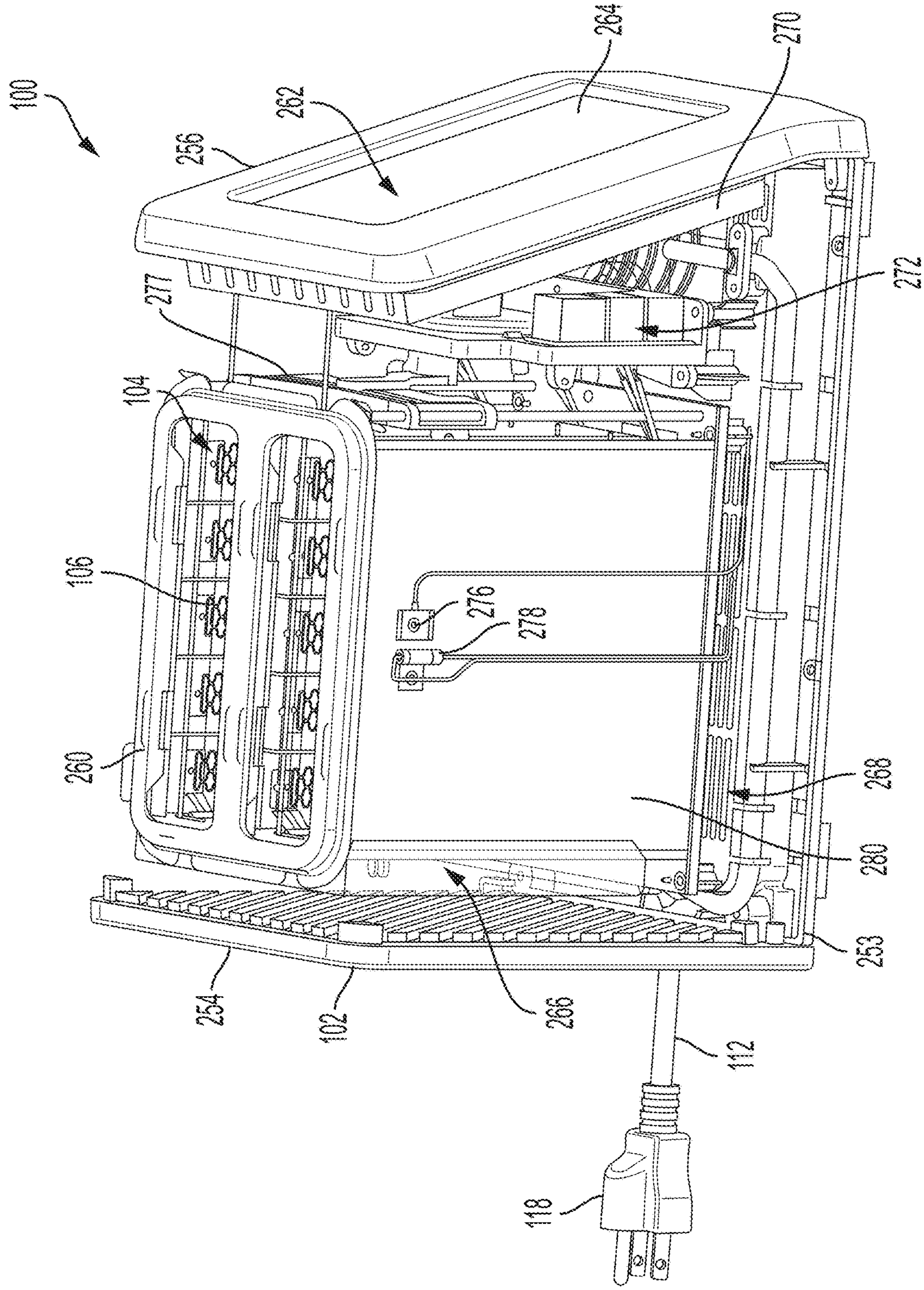
FIG. 14 is perspective view of the FIG. 13 cooking appliance with a portion of a housing removed.

FIGS. 13 and 14 show views of another cooking appliance 100 that incorporates various aspects of the invention. The cooking appliance 100 in this embodiment is a toaster with a housing 102 that defines one or more cooking cavities 104 and has a heating assembly 106 disposed at least partially therein. A plug 118 may extend from the housing 102 via a power cable 112 such that power can be supplied to the cooking appliance 100. As described above, in operation, the heating assembly 106 generates infrared radiation to heat food in a cooking cavity 104 of the cooking appliance 100. As in other embodiments, the cooking appliance 100 can take a variety of forms, in addition to or alternatively from the example illustrated in FIGS. 13 and 14 (e.g., a toaster, a toaster oven, a microwave oven, and electric grill, a contact cooker, a slow cooker, etc.) as required or desired.

In this embodiment, the housing 102 includes a base 253, a rear wall 254, a front wall 256, and a cover 258 (which is removed in FIG. 14). A chassis 260 is at least partially disposed within the housing 102, supports the heating assemblies 106, and defines the cooking cavities 104. The front wall 256 includes a user interface 262 to provide information to and/or receive information from a user, e.g., to control operation of the cooking appliance 100. The user interface 262 may include one or more input devices(s) such as tactile buttons, knobs, switches, and/or one or more display/control screens, including capacitive touch screens with graphic user interfaces (GUIs) so as to enable user interaction with and control of the cooking appliance 100. In this example, the user interface 262 is a single capacitive touch screen 264 that provides user control of the cooking appliance 100. In examples, the touch screen 264 may enable functionality of the cooking appliance 100 such as food product selection, infrared radiation (e.g., toast) level and/or duration, start operations, cancel operations, auto-warming, auto-reheat, etc. Additionally or alternatively, the touch screen 264 may display information such as time, date, food product images, timers, etc.

The user interface 262 may be part of an electrical coupling and control 110 that includes one or more computing devices and/or other components suitable for implementing one or more functions described herein. For example, the electrical coupling and control 110 may include at least one data processing unit and system memory. Depending on the configuration and type of computing device, the system memory (storing, among other things, instructions to perform the display setting and control methods described herein) can be volatile (such as RAM), non-volatile (such as ROM, flash memory, etc.) or some other combination of memory. The system memory may include an operating system and one or more program modules suitable for performing the various aspects described herein and controlling the cooking appliance 100. Furthermore, examples of the disclosure may be practiced in an electrical circuit comprising discrete electronic elements, packaged or integrated electronic chips containing logic gates, a circuit utilizing a microprocessor, or on a single chip containing electronic elements or microprocessors. The user interface 262 may also include one or more output devices such as speakers for audio output. Additionally, the electrical coupling and control 110 may include one or more communication connections such as transmitters, receivers, and/or transceiver circuitry allowing communication with external device(s) (e.g., a smartphone) as required or desired.

In operation, electric power is supplied to the heating assembly 106 such that infrared radiation is generated and directed to a food product in a cooking cavity 104. As such, heat is generated within the chassis 260 during operation, and may be limited to the area of the chassis 260 so that heat does not undesirably impact other portions of the cooking appliance 100, such as by undesirably heating the electronic components of the user interface 262. To at least partially control heat transmission in the cooking appliance 100, the heating assemblies 106 may direct and/or reflect infrared radiation toward the cooking cavities 104, which are open at top, so that excess heat, if any, can be exhausted from chassis 260 and reduce heating of other components.

As illustrated in FIG. 14, the chassis 260 may be spaced apart from the rear wall 254 and the front wall 256, and is only partially coupled to the cover 258, thereby forming an air gap 266 between the chassis 260 and the housing 102. This air gap 266 enables cooling air flow to be induced around the chassis 260 and reduce heat transfer to other components. For example, hot air rises and as such, vent openings 268 are defined within the base 253 so that air flow within the cooking appliance 100 can be directed from the bottom towards the top and pass across the chassis 260. One or more of the rear wall 254, the front wall 256, and the cover 258 may also include vent slots that enable air flow into and/or out of the cooking appliance 100.

A heat shield 270 may at least partially surround the user interface 262 so as to block the infrared radiation from the electronic components therein. The heat shield 270 may be at least partially open at the top and the bottom so that air flow can be channeled through the heat shield 270 and provide further cooling for the components therein. In addition, the cooking appliance 100 includes a drive assembly 272 (e.g., a motor and actuator components) that drives movement of a lifting arm 274 (shown in FIG. 15) for the food product within the cooking cavities 104. The drive assembly 272 may be positioned between the chassis 260 and the user interface 262 so as to further block infrared radiation. The drive assembly 272 is further described below with reference to FIG. 18, but generally assists with supporting food in the cooking cavities 104, as well as moving food into and/or out or a cavity 104.

As can be seen in FIG. 14, the cooking appliance 100 includes one or more sensors 276, 278 that facilitate operation of the appliance. A temperature sensor 276 is coupled to the chassis 260 and is configured to measure a temperature indicative of a temperature in the cooking cavities 104 and provide the temperature information to the electrical coupling and control 110. This sensor 276 enables control of the cooking temperature, e.g., by providing information to control turning on and off of the heating assemblies 106. Furthermore, the sensor 276 can be used to turn the heating assemblies 106 off when a predetermined temperature is reached to prevent the cooking appliance 100 from overheating. In one example, the temperature sensor 276 is a thermistor.

A thermal cutoff 278 may be coupled to the chassis 260 and configured to measure a temperature indicative of a temperature within the cooking cavities 104 or elsewhere in the appliance 100. This information can be used to shut the cooking appliance 100 completely off, or at least to shut off the heating assemblies 106, when a predetermined temperature is reached. The thermal cutoff 278 may be a one-time use device, such as a thermal fuse, or may be reset manually or automatically as required or desired. In this example, a temperature value detected by the temperature sensor 276 that is used to turn off the heating assemblies 106 is set at a lower value than a temperature value of the thermal cutoff 278 used to shut down the heating assemblies 106. Thus, the electrical coupling and control 110 may use the temperature sensor 276 to control on/off cycling of the heating assemblies 106 to control a temperature in the cooking cavities 104 without causing the appliance to overheat and trip the thermal cutoff 278. By using the temperature sensor 276 to control the heating assembly 106 operation, the cooking appliance 100 can use more power than a conventional conduction heating appliance (e.g., about 40% more watts-about 1,400 watts compared to 1,000 watts) while reducing or preventing appliance overheating.

Figure 15:
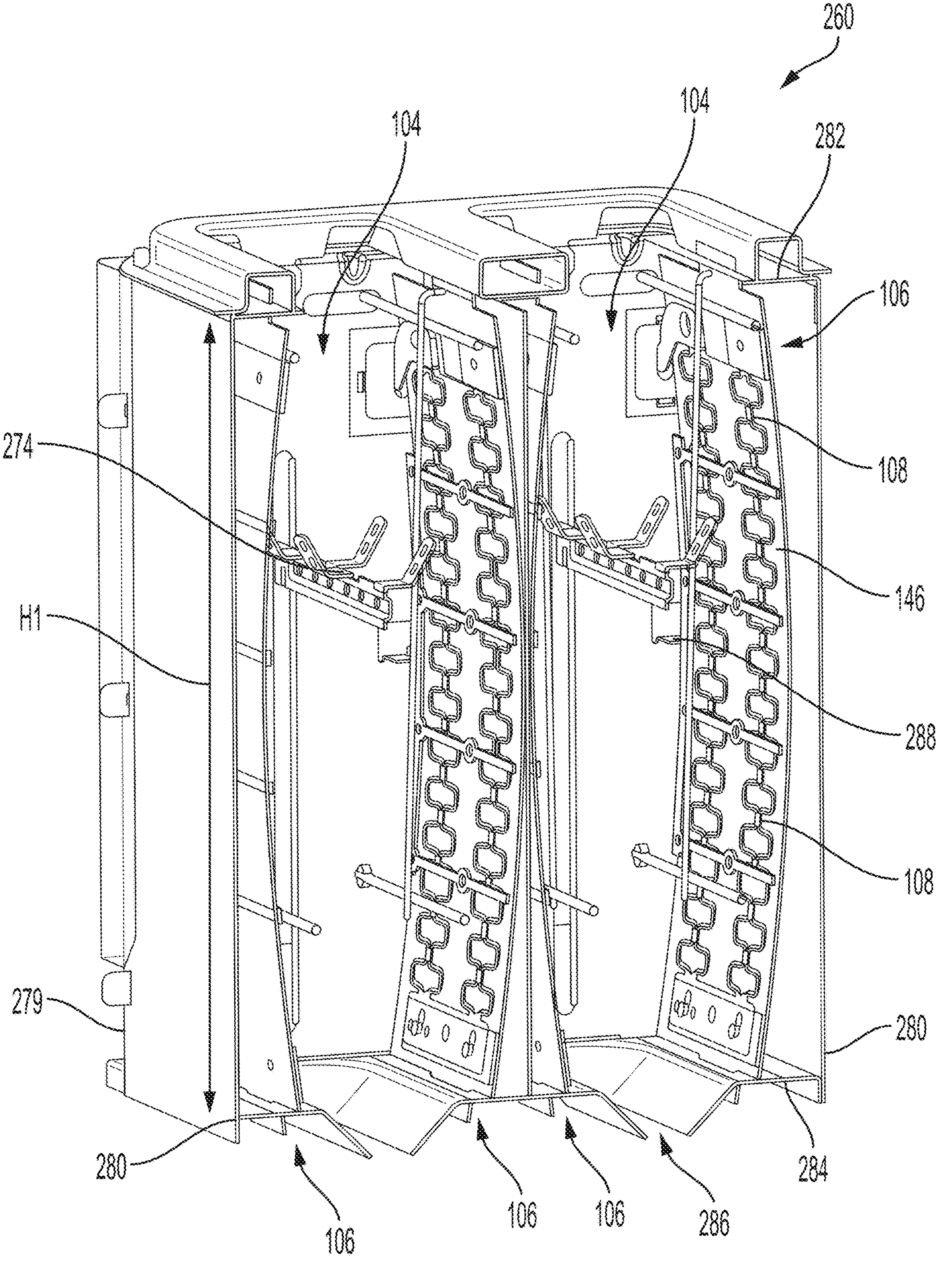
FIG. 15 is a cross-sectional perspective view of the FIG. 13 cooking appliance.

FIG. 15 is a cross-sectional perspective view of the chassis 260 of the cooking appliance 100 in FIGS. 13 and 14. Each heating assembly 106 includes heating elements 108, and is supported by the chassis 260 such that a cooking cavity 104 is defined between opposed heating assemblies 106. This allows the heating assemblies 106 to heat a food product held by a lifting arm 274 in the cooking cavity 104. The chassis 260 includes a plurality of side walls (e.g., a front wall 277, a rear wall 279, and left and right walls 280) extending between a top wall 282 and a bottom wall 284. The heating assemblies 106 are coupled to and supported by the top and bottom walls 282, 284, while being oriented substantially perpendicular to the front and rear walls 277, 279 and substantially parallel to the left and right walls 280. The bottom wall 284 includes one or more openings 286 aligned with the cooking cavity 104 so that food product particles (e.g., toast crumb) may fall through the chassis 260 for removal. The openings 286 may be formed as a funnel shape (e.g., tapered) as required or desired.

In accordance with an aspect of the invention, each of the heating elements 108 are curved and have a concave side that faces toward a corresponding cooking cavity 104. That is, the curve of the heating element 108 is concave in the direction towards the cooking cavity 104 and convex in a direction away from the cooking cavity 104. Since the heating elements 108 each define a sheet with a length and width, the curved heating elements 108 define a cylindrical shell-type shape, or other similar curved shape (such as one that has a variable radius). By arranging the heating element 108 in a curved configuration, infrared radiation emitted by the element 108 may be focused in a direction towards the cooking cavity 104. Also, the heating element 108 is directly exposed to the cooking cavity 104, i.e., the metallic or other part of the heating element 108 that emits infrared radiation is directly exposed to the cavity 104 without any intervening component such as electrical insulation, a glass or ceramic covering for the element 108, or other. As such, the heat transfer from the heating element 108 to the food product may be increased, thereby increasing the efficiency and performance of the cooking appliance 100.

In addition, arranging the heating elements 108 which define a sheet having a length and width so as to have a curved shape can help maintain proper orientation of the heating element 108 with respect to the cooking cavity 104 throughout each cooking cycle, and between separate cooking cycles. For example, as a heating element 108 heats and cools during each cooking cycle, the heating element 108 will generally change length and/or width due to thermal expansion and contraction. By arranging heating elements 108 to have a curved shape that faces the cooking cavity 104, elongation and/or contraction of the heating element 108 along its length and/or width will tend to keep the heating element 108 in its curved shape. For example, even if a heating element 108 is fixed at its ends relative to the chassis 260, if the heating element 108 has a curved shape like that shown in FIG. 15, elongation and/or contraction of the heating element 108 along its length will tend to increase or decrease the radius of curvature of the element 108, but otherwise the element 108 will maintain the curved shape. As a result, a distance between portions of the heating element 108 and the cooking cavity 104 will not change much and will be consistent for each heating and cooling cycle. In contrast, a heating element that is mounted in a straight or planar configuration with fixed ends relative to the chassis 260 may bend or buckle unpredictably when heated or cooled, e.g., the element may bend toward and/or away from the cavity as the element grows longer due to thermal expansion. As a result, such an element will have different and unpredictable orientations and distances to the cooking cavity for each heating and cooling cycle. In contrast, heating elements 108 arranged like that in FIG. 15 will tend to have a predictable shape, orientation and distance from a cooking cavity, even when experiencing thermal expansion and/or contraction.

In some examples, each of the heating elements 108 of a heating assembly 106 or of different heating assemblies 106 may have a substantially similar shape of curvature. In other examples, one or more heating elements 108 may have a different shapes of curvature than other heating elements 108, whether included in a same or different heating assembly 106. For example, heating elements 108 that are proximate to the left and right side walls 280 may have a smaller radius of curvature (e.g., a greater curve) than the heating elements 108 disposed in the center of the chassis 260 (e.g., a more shallow or lesser curve). In some cases, heating elements 108 have a largest curvature possible to focus infrared radiation towards a food product without being smaller in height than the cooking cavity 104. In still other examples, other curved concave shapes may be used, for example, two oblique surfaces disposed at an angle to one another, a trapezoidal shape, etc.

In this embodiment, each heating assembly 106 includes a support 146 with a heating element 108 coupled thereto. The support 146 may be formed of a material suitably arranged to allow the support 146 to be curved, e.g., when the heating assembly 106 is mounted in the chassis 206. That is, in accordance with an aspect of the invention, a support 146 for a heating assembly 106 may have a curved shape with a concave side facing towards a corresponding cooking cavity 104. This arrangement may allow the support 146 to maintain its curved shape even with thermal expansion and contraction of the support 146 during heating and cooling cycles of a heating element 108 associated with the support 146. This arrangement may be particularly useful when a support 146 is maintained in a stressed state while in a curved configuration in a cooking appliance 100. For example, the support 146 may have a planar shape when unstressed, and may be stressed and elastically deformed to take a curved shape when held in a cooking appliance 100. As a result, the support 146 may maintain the curved shape, even if the support 146 expands and/or contracts due to thermal expansion and/or contraction. This may help the support 146 maintain a suitable shape relative to a corresponding cooking cavity 104 (e.g., so the support can reflect infrared energy in a focused way toward the cavity 104) and/or help an attached heating element 108 keep a desired curved or other shape relative to the cavity 104. The support 146 may be arranged in different ways, e.g., of a suitably rigid material that has at least some elasticity so that the support 146 can be bent from a planar shape to a curved shape. In an example, the support 146 may be formed of a sheet of mica material that has a thickness of 0.16 inches.

Figure 16:
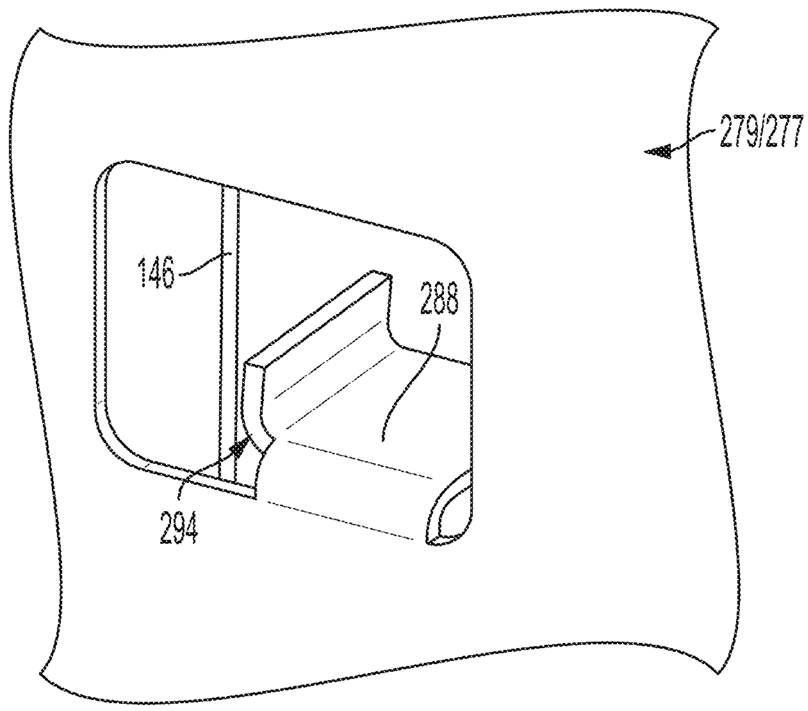
FIG. 16 is a perspective view of an exemplary clip used to engage with a heating assembly in the FIG. 15 embodiment.

To form the curved shape of a support 146, the support 146 may initially be flat and planar with one or more heating elements 108 attached to the support 146. As can be seen in FIG. 15, the support 146 may be flexed (i.e., deformed elastically so the support 146 has a curved shape) and engaged with the chassis 260 so that the chassis 260 holds the support 146 in the curved shape. For example, top and bottom portions of the support 146 (e.g., tabs 148) may be inserted into corresponding openings of the chassis 260 and the support 146 released from a bending force (which may be applied by hand). The chassis 260 may be sized and arranged so that the support 146 is prevented from returning to its planar shape, and instead is held in the curved shape shown in FIG. 15, e.g., by the chassis 260 applying a compressive force on the support 146. For example, a distance between the portions of the chassis 260 that receive the tabs 148 may be smaller than a length of the support 146 at portions that contact the chassis 260. As a result, the support 146 cannot return to its original planar shape and is held in place in a curved configuration by the top and bottom walls 282, 284 of the chassis 260. Additionally, the support 146 may be supported at one or more intermediate positions along its length to form the curved shape. For example, as shown in FIG. 15, the front and rear walls 277, 279 of the chassis 260 may include a clip 288 that engages with an edge of the support 146 (though not the heating element) so as to at least partially define the curved shape. FIG. 16 shows a close up view of the clip 288 which may be included with the front and rear walls 277, 279. In this embodiment, the clip 288 extends from the front or rear wall 177, 279 and engages with the support 146 to help hold the support 146 in a curved shape. For example, during assembly the support 146 may be placed within the chassis 260 and then curved in the required or desired direction. Once the support 146 is engaged at the top and bottom walls 282, 284 of the chassis 260 (e.g., by inserting tabs 148 into corresponding slots), the clip 288 can be folded inwardly as shown in FIG. 16 to secure the support 146 in the curved configuration. In other examples, the clip 288 may be a static structure of the front or rear wall 277, 279 that the contacts the support 146. The clip 288 can include a curved surface 294 so as to reduce wear on the support 146, e.g., during thermal expansion and contraction or other movement of the support 146.

In this embodiment, the curved shape of the support 146 is formed during assembly of the support 146 within the cooking appliance 100. Also, a curved shape of the heating elements 108 is formed when the support 146 is bent to take a curved shape. However, this is not required. In other examples, the support 146 and/or heating element 108 may be manufactured with a curved shape that is maintained when assembled within the chassis 260, e.g., the support 146 may have a curved shape in an unstressed state. Note also that a support 146 or heating element 108 having a curved shape may be used alone or in combination with each other, e.g., a curved support 146 may be used to support one or more heating elements 108 having a flat, straight and/or planar configuration. Alternately, heating elements 108 having a curved shape may be employed with a flat and planar support 146.

Figure 17:
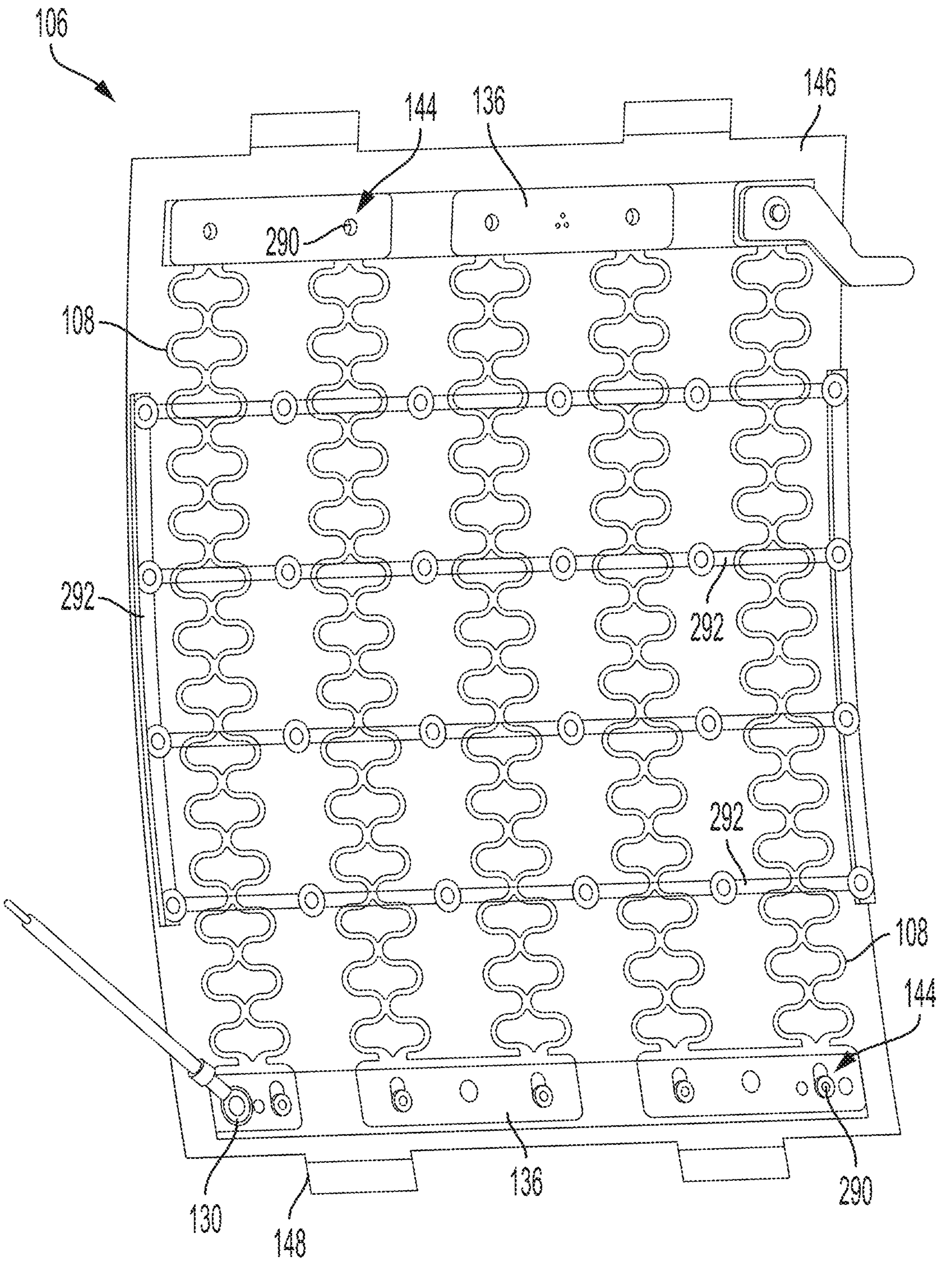
FIG. 17 is a perspective view of a heating assembly of the FIG. 13 cooking appliance.

FIG. 17 is a perspective view of a heating assembly 106 used in the embodiment of FIGS. 13-15. In this embodiment, the support 146 and the heating elements 108 attached to the support 146 have a curved configuration or shape, e.g., as held in the chassis 260. In accordance with an aspect of the invention, the heating elements 108 are attached to the support 146 so that the heating elements 108 are slidably coupled and can move relative to the support 146 along a length of the heating elements 108. This slidable coupling of the heating elements 108 to the support 146 can allow the heating elements 108 to expand or contract along their length and/or other directions parallel to the plane of the heating elements 108 (e.g., due to thermal expansion or contraction), and may allow the elements 108 to maintain a curved shape during such movement. In this embodiment, one or more retainers 292 are coupled to the support 146 and extend over and contact one or more heating elements 108. The retainers 292 may provide various functions, such as securing the heating elements 108 to the support 146 so that as the support 146 is flexed or otherwise bent from a planar configuration, the retainers 292 cause at least portions of the heating elements 108 to move with the support 146. As a result, the retainers 292 may contact the heating elements 108 so as to cause the heating elements 108 to take a curved shape when the support 146 is bent into a curved shape. Alternately, or in addition, the retainers 292 may contact the heating elements 108 in such a way that the heating elements can move in directions along the surface of the support 146 (e.g., along a length of the heating element 108), but are restrained in movement in directions away from the support 146. Thus, for example, the retainers 292 may cause the heating elements 108 to take a curved shape, but allow the heating element 108 to move relative to the support 146 along the length of the heating elements 108 or other directions along the surface of the support 146 facing the heating elements 108.

The retainers 292 may also contact the heating elements 108 in a way to restrain their movement in directions away from the surface of the support 146 that faces the elements 108 while also allowing the heating elements 108 to avoid contact with the surface of the support 146. Instead, the retainers 292 can hold the heating elements 108 such that the heating elements 108 are spaced from the support 146, e.g., by a distance of a few millimeters. By avoiding contact with the support 146, at least in some areas, the heating elements 108 may avoid heat loss to the support 146 by thermal conduction, thereby allowing the heating elements 108 to more effectively heat and generate infrared radiation. For example, as shown in FIG. 17, the retainers 292 may each be formed as a bar or strip that is attached to the support 146 at locations on opposite lateral sides of a heating element 108. Rather than squeezing or pressing the heating element 108 into contact with the support 146, the retainer 292 may define a gap or space between the support 146 and the retainer 292 that is larger than the thickness T of the heating element 108. As a result, the heating element 108 may be free to move in directions along the surface of the support 146 near the retainer 292. The gap or space between the support 146 and the retainer 292 may be formed by securing the retainer 292 to the support 146 using a washer or other spacer, e.g., at a rivet or other fastener used to attach the retainer 292 to the support. The washer or spacer may have a thickness that defines a desired gap or space height in which the heating element 108 is captured by the retainer 292. In another embodiment, a spacer may be positioned between the heating element 108 and the support 146 so the heating element 108 is held away from the support 146 by the spacer. The spacer may have a shape that is the same as or similar to the retainer 292, e.g., a bar or strip-shaped spacer may be attached to the support 146 between the heating element 108 and the support 146 using a same rivet or other fastener used to attach the retainer 292 to the support 146 over the heating element. Thus, the heating element 108 may be captured between the retainer 292 and spacer so the heating element 108 is held out of contact with the support 146, e.g., at least between longitudinal ends of the element 108. The spacer and/or retainer 292 may be made of a material having low thermal conductivity and/or thermal capacitance, as well as having minimal dimensions, thereby reducing any heat loss to the spacer and/or retainer 292.

FIG. 17 shows retainers 292 arranged as multiple strips or bars that extend across an entire width of the support 146 and that are attached to the support 146 by rivets or other fasteners at locations between each heating element 108. However, retainers 292 may be arranged in other ways, e.g., only one retainer 292 may be provided that extends across the support 146, and retainers 292 may be attached to the support 146 in other ways, such as by an adhesive. Also, the retainers 292 in this embodiment are arranged to cause the heating elements 108 to take a curved shape when the support 146 is bent into a curved shape. However, in other arrangements, the retainer 292 may be configured to allow the heating elements 108 to keep or take a planar shape when the support 146 is bent into a curved configuration. Alternately, the retainers 292 may cause the heating elements 108 to be in a curved configuration when the support 146 is planar or flat.

Also in accordance with the aspect of attaching heating elements 108 to a support 146 to allow slidable movement of the element 108, apertures 144 at lower terminals 130 and/or buses 136 are formed to have a slot shape having a long dimension that extends along a length of the heating elements 108. Rivets or other fasteners 290 are attached to the support 146 and engage with the apertures 144 so that heating elements 108 are secured to the support 146 but allowed to move in directions along the surface of the support 146 adjacent the heating elements 108, e.g., the heating elements 108 can move along their length by thermal expansion/contraction and/or due to bending of the heating assembly 106 during assembly of the appliance 100. In this embodiment, apertures 144 at upper terminals 130 and/or buses 136 are formed as circular openings that are secured to the support 146 by a fastener 290. Thus, upper ends of the heating elements 108 may be fixed relative to the support 146 although the heating element 108 is otherwise slidably attached to the support 146 by the lower apertures 144. Other arrangements are possible, such as providing slot shaped apertures 144 at upper ends of the heating elements 108 like at the lower ends. Note that the use of retainers 292 and slot shaped apertures 144 or similar mounting configurations may be used alone, or together as shown in FIG. 17.

Figure 18:
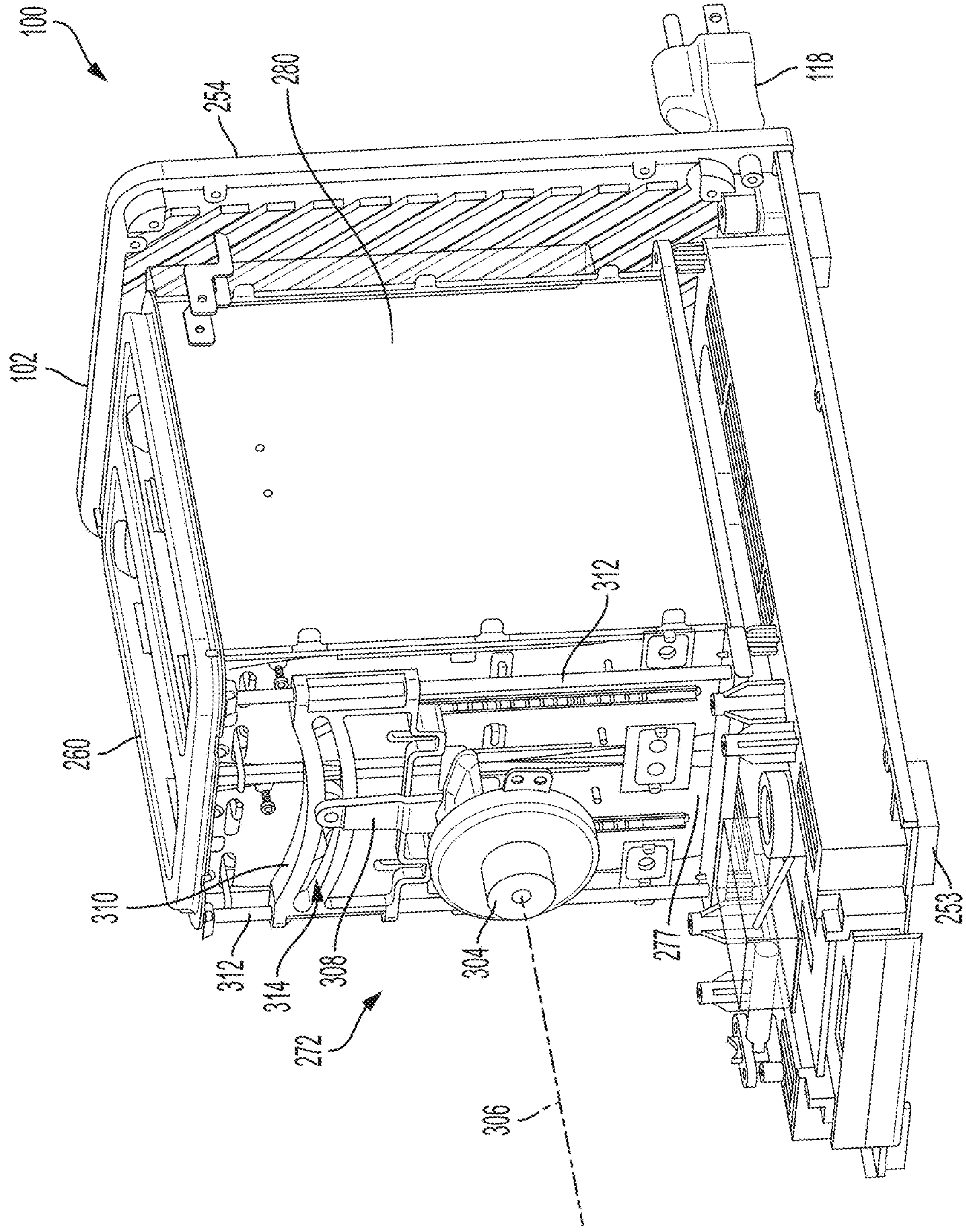
FIG. 18 is perspective view of the FIG. 13 cooking appliance illustrating a drive assembly for lifting arms of the cooking cavity.
Figure 19:
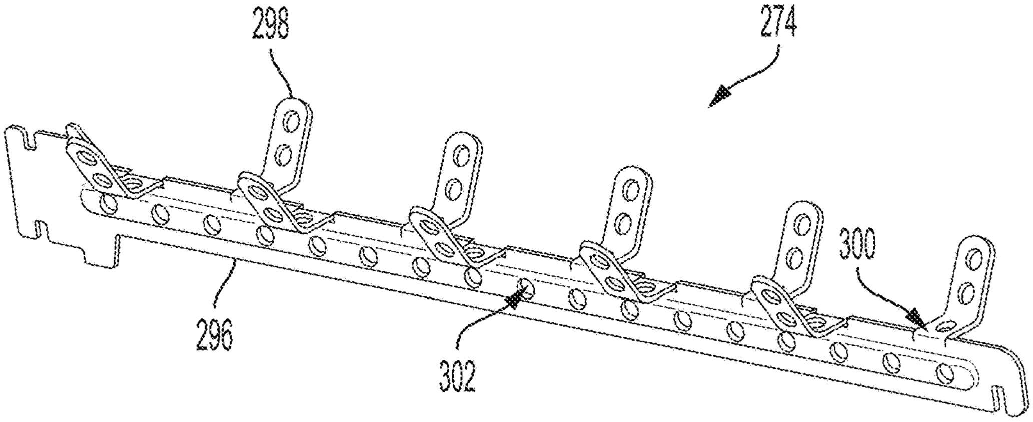
FIG. 19 is a perspective view of a lifting arm of the FIG. 13 embodiment.

FIG. 18 shows details of the drive assembly 272 which is adjacent to the front wall 277 of the chassis 260 and is configured to automatically raise and lower the lifting arms 274, one of which is shown in detail in FIG. 19. The drive assembly 272 may include an electronic motor (not shown) that drives a drive disk 304 about a rotational axis 306. The drive disk 304 is coupled to a drive bar 308 that is coupled to a carriage 310 supporting the lifting arms 274 so that rotation of the drive disk 304 causes the carriage 310 to move upwardly and downwardly on two parallel posts 312. Movement of the carriage 310 along the posts 312 causes the lifting arms 274 to move a food product upwardly and downwardly in a cooking cavity 104, e.g., so a slice of bread can be received into and lifted from a cooking cavity 104. The lifting arms 274 each include an elongate bar 296 that has one end configured to couple to the carriage 310. A plurality of ribs 298 extend from the elongate bar 296 and form a support surface 300 for the food product. The elongate bar 296 and/or the ribs 298 include one or more holes 302 defined therein. These holes 302 reduce the thermal mass and thermal capacity of the lifting arm 274 so that the heating elements heat the food product and not the lifting arm 274, thereby increasing the efficiency and performance of the cooking appliance. Furthermore, since the heating elements generate infrared radiation, the holes 302 facilitate a direct line of sight to the food product so that even portions of the food product that are within the ribs 298 are heated and toasted.

In operation, as the drive disk 304 rotates, the drive bar 308 is pulled either upwards or downwards to raise or lower the carriage 310. The drive bar 308 is coupled to an elongated channel 314 of the carriage 310 that extends between the two posts 312 and substantially orthogonal to the rotational axis 306. The channel 314 enables for the drive bar 308 to move laterally between the two posts 312 due to the rotation of the drive disk 304 without moving the carriage 310 laterally. As described above, the drive assembly 272 also provides blocking structure for the infrared radiation on the user interface 262.

Figure 20:
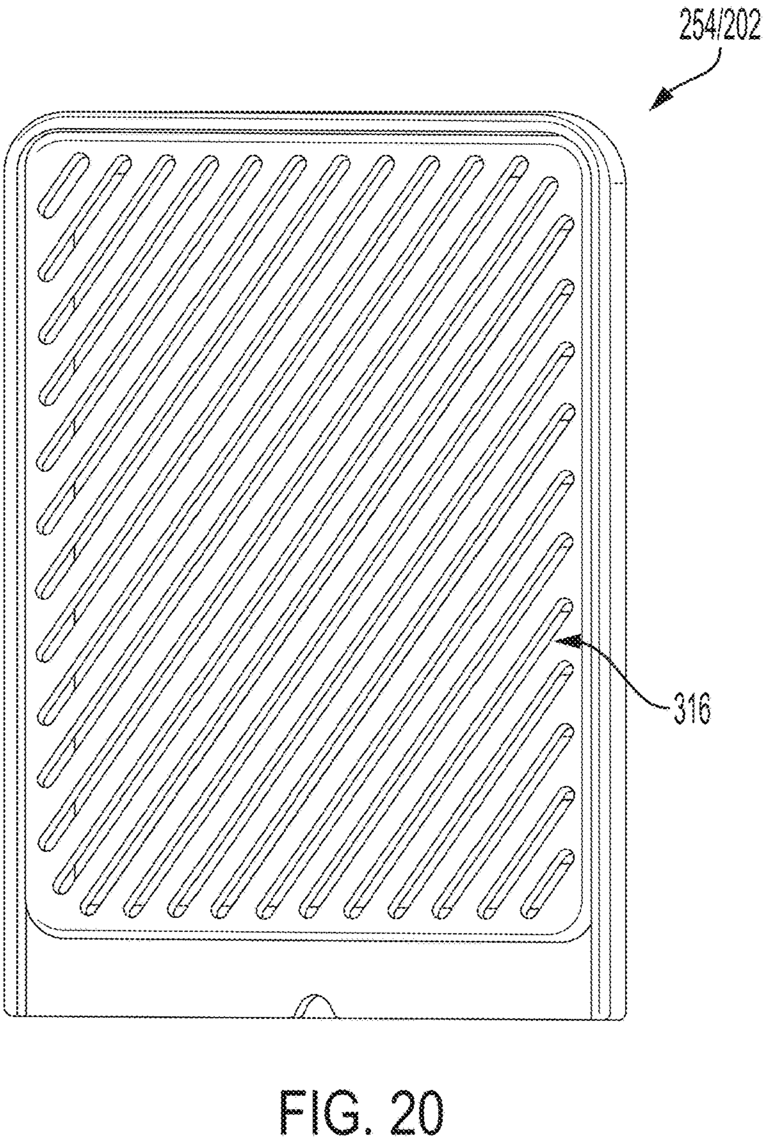
FIG. 20 is a perspective view of an exemplary rear wall of the FIG. 13 cooking appliance housing.

FIG. 20 is a perspective view of the rear wall 254 of the housing 102. As described above in reference to FIG. 14, the cooking appliance 100 induces a cooling air flow through the housing 102. At least a portion of the extracted heat is exhausted out of the top of the housing 102. Additionally or alternatively, the rear wall 254 includes a plurality of vent slots 316 so that at least a portion of the extracted heat can be exhausted out of the rear of the housing 102. In other examples, other housing components, such as the cover 258 or the front wall 256 (shown in FIG. 13), may include vent slots 316 as required or desired.

The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the following claims.

The invention claimed is:

1. A heating assembly for a cooking appliance, comprising:
- a support having a first side with a surface;
- an electrical resistance heating element defining a sheet having a length and a width and a plurality of openings formed in the sheet, the heating element extending across the surface and being slidably coupled to the support by a fastener such that the heating element is slidably movable relative to the fastener and the support along the length of the heating element; and
- a retainer coupled over the heating element and to the support such that the heating element is positioned between the support and the retainer.

2. The heating assembly of claim 1, wherein the heating element comprises at least one elongated aperture, and wherein the fastener slidably couples the support to the heating element via the at least one elongated aperture.

3. The heating assembly of claim 1, wherein the support includes a flexible sheet of material, and the support is configured to bend elastically such that the support and the heating element each have a curved shape.

4. The heating assembly of claim 1, wherein the retainer coupled is over the heating element and to the support at a location between opposite ends of the heating element and the fastener secures the retainer to the support.

5. The heating assembly of claim 4, wherein the heating element is slidable along its length relative to the retainer.

6. The heating assembly of claim 5, wherein the heating element and the retainer are coupled to the first side of the support, wherein the support, heating element and retainer are configured such that bending of the support causes the support and the heating element to have a curved shape with a concave side at the first side of the support.

7. A toaster comprising the heating assembly of claim 1.

8. The heating assembly of claim 1, wherein the heating assembly includes a plurality of heating elements extending across the surface and slidably coupled to the support, each of the plurality of heating elements defining a sheet having a length and a width and having a plurality of openings formed in the sheet.

9. The heating assembly of claim 8, wherein each of the plurality of heating elements have first and second opposed sides and the second sides of the plurality of heating elements are positioned nearer to the support than the first sides, the second sides being out of contact with the support at portions along the length of the heating elements.

10. The heating assembly of claim 8, wherein the retainer extends over a part of the plurality of heating elements and holds the plurality of heating elements on the support, each of the heating elements being slidably movable relative to the retainer.

11. The heating assembly of claim 10, wherein the retainer is positioned over the part of the plurality of heating elements at a location between opposite ends of the heating elements.

12. The heating assembly of claim 1, wherein the support is configured to reflect infrared radiation emitted by the heating element in a direction toward the heating element.

13. The heating assembly of claim 1, wherein the heating element has first and second opposed sides and the second side of the heating element is positioned nearer to the support than the first side, the second side being out of contact with the support at portions along the length of the heating element.

14. The heating assembly of claim 1, wherein the support has a perimeter extending around the first side, and the heating element is located within the perimeter.

15. A method of assembling a cooking appliance, the method comprising:

providing a chassis that defines at least one cooking cavity for receiving food therein, wherein the chassis includes a top wall, a bottom wall, and at least one side wall, inserting at least one heating assembly at least partially within the chassis, wherein the at least one heating assembly includes a support and a heating element attached to the support, and wherein prior to inserting the at least one heating assembly the support is substantially flat; and forming the at least one heating assembly into a curved shape within the chassis by elastically bending at least a portion of the at least one heating assembly, wherein a concave side of the heating element faces towards the at least one cooking cavity.

16. A cooking appliance comprising:

a housing defining a cooking cavity for receiving food therein; and a heating assembly arranged to provide infrared radiation into the cooking cavity, wherein the heating assembly comprises:

a support having a curved shape with a concave side facing toward the cooking cavity; and an electrical resistance heating element coupled to the support and exposed to the cooking cavity, wherein the support is configured to have a planar shape when in an unstressed state and to be elastically bent to have the curved shape when in a stressed state, the support being mounted in the cooking appliance and held in the stressed state such that the support maintains its curved shape with the concave side facing towards the cooking cavity with thermal expansion and thermal contraction of the support.

17. The cooking appliance of claim 16, wherein the heating element defines a sheet having a length and a width and having a plurality of openings formed in the sheet.

18. The cooking appliance of claim 16, wherein the support includes a flexible sheet of material, and the heating element and support are configured to bend such that the support and the heating element each have the curved shape.

19. The cooking appliance of claim 16, further comprising a retainer coupled over the heating element and to the support such that the heating element is positioned between the support and the retainer.

20. The cooking appliance of claim 19, wherein the heating element is slidable along its length relative to the retainer.

21. The cooking appliance of claim 16, wherein the heating assembly includes a plurality of heating elements coupled to the support, each of the plurality of heating elements defining a sheet having a length and a width and having a plurality of openings formed in the sheet, and the plurality of heating elements being electrically connected in series.

22. The cooking appliance of claim 21, wherein each of the plurality of heating elements have first and second opposed sides and the second sides are positioned nearer to the support than the first sides, the second sides of the plurality of heating elements being out of contact with the support at portions along the length of the heating elements.

23. The cooking appliance of claim 21, further comprising a retainer extending over a part of the plurality of heating elements and holding the heating elements on the support, each of the heating elements being slidably movable relative to the retainer.

24. The cooking appliance of claim 23, wherein the retainer is positioned over the part of the plurality of heating elements at a location between opposite ends of the heating elements.

25. The cooking appliance of claim 16, wherein the support is configured to reflect infrared radiation emitted by the heating element in a direction toward the heating element.

26. The cooking appliance of claim 16, wherein the heating element has first and second opposed sides and the second side is positioned nearer the support than the first side, the second side of the heating element being out of contact with the support at portions along the length of the heating element segment.

27. The cooking appliance of claim 16, wherein the heating element comprises at least one elongated aperture, and wherein at least one fastener slidably couples the support to the heating element via the at least one elongated aperture.

* * * * *